(12) United States Patent
Inoue et al.

(10) Patent No.: US 8,588,835 B2
(45) Date of Patent: Nov. 19, 2013

(54) BASE STATION APPARATUS AND DIRECTIVITY CONTROL METHOD IN MOBILE COMMUNICATION SYSTEM

(75) Inventors: Yuki Inoue, Yokohama (JP); Keizo Cho, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 384 days.

(21) Appl. No.: 12/666,414

(22) PCT Filed: Jul. 2, 2008

(86) PCT No.: PCT/JP2008/061994
§ 371 (c)(1),
(2), (4) Date: Jun. 24, 2010

(87) PCT Pub. No.: WO2009/008306
PCT Pub. Date: Jan. 15, 2009

(65) Prior Publication Data
US 2010/0311456 A1    Dec. 9, 2010

(30) Foreign Application Priority Data
Jul. 6, 2007   (JP) .................................. 2007-178726

(51) Int. Cl.
*H04B 7/00* (2006.01)
(52) U.S. Cl.
USPC ........ 455/513; 455/115.3; 455/134; 455/135; 455/161.3; 455/226.2; 455/277.2; 455/13.4; 455/522; 455/69
(58) Field of Classification Search
None
See application file for complete search history.

(56) References Cited

U.S. PATENT DOCUMENTS

| 2002/0126045 A1* | 9/2002 | Kishigami et al. ............. 342/417 |
| 2003/0161384 A1* | 8/2003 | Chun et al. .................... 375/130 |
| 2008/0056217 A1* | 3/2008 | Hara et al. ..................... 370/342 |
| 2009/0279512 A1* | 11/2009 | Fujishima et al. ............. 370/336 |

FOREIGN PATENT DOCUMENTS

| JP | 2000-511370 A | 8/2000 |
| JP | 2001-007754 A | 1/2001 |
| JP | 2004-297575 A | 10/2004 |
| JP | 2005-109690 A | 4/2005 |
| JP | 2006-80669 A | 3/2006 |
| JP | 2006-135673 A | 5/2006 |
| WO | 97/45968 A1 | 12/1997 |

OTHER PUBLICATIONS

International Search Report w/translation from PCT/JP2008/061994 dated Aug. 26, 2008 (3 pages).
Written Opinion from PCT/JP2008/061994 dated Aug. 26, 2008 (4 pages).
Patent Abstracts of Japan; Publication No. 2001-007754 datd Jan. 12, 2001 (1 page).

(Continued)

*Primary Examiner* — Yuwen Pan
*Assistant Examiner* — Fanghwa Wang
(74) *Attorney, Agent, or Firm* — Osha Liang LLP

(57) ABSTRACT

A disclosed base station apparatus for a mobile communication system includes a collection unit collecting measured data from one or more user equipment terminals with respect to each direction of arrival, the measured data including at least quality information of a downlink signal, a conversion unit converting the measured data into an evaluation value in accordance with a predetermined evaluation function, a deriving unit deriving a weight update amount determining directivity based on an angular distribution of the plural evaluation values, and a transmission unit transmitting a downlink signal weighted based on the weight update amount.

11 Claims, 20 Drawing Sheets

(56) References Cited

OTHER PUBLICATIONS

Patent Abstracts of Japan; Publication No. 2004-297575 dated Oct. 21, 2004 (1 page).
Patent Abstracts of Japan; Publication No. 2006-080669 dated Mar. 23, 2006 (1 page).
Patent Abstracts of Japan; Publication No. 2006-135673 dated May 25, 2006 (1 page).
Patent Abstracts of Japan; Publication No. 2005-109690 dated Apr. 21, 2005 (1 page).

* cited by examiner

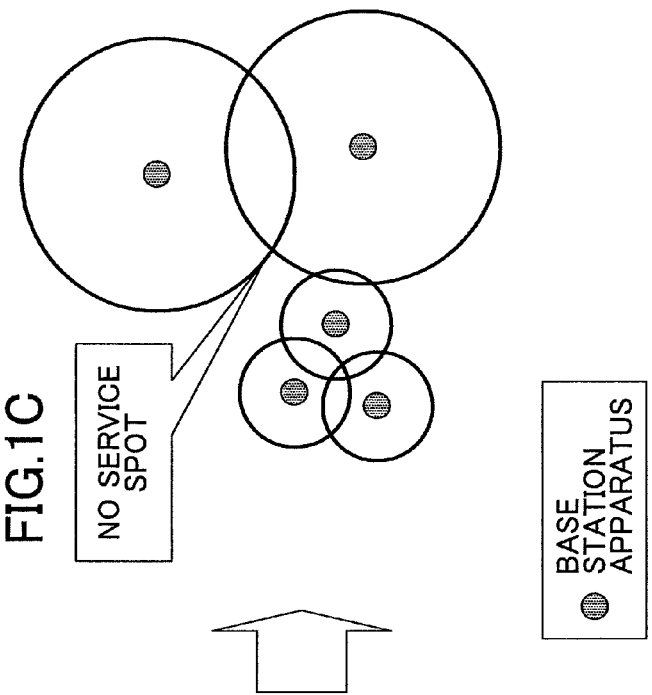
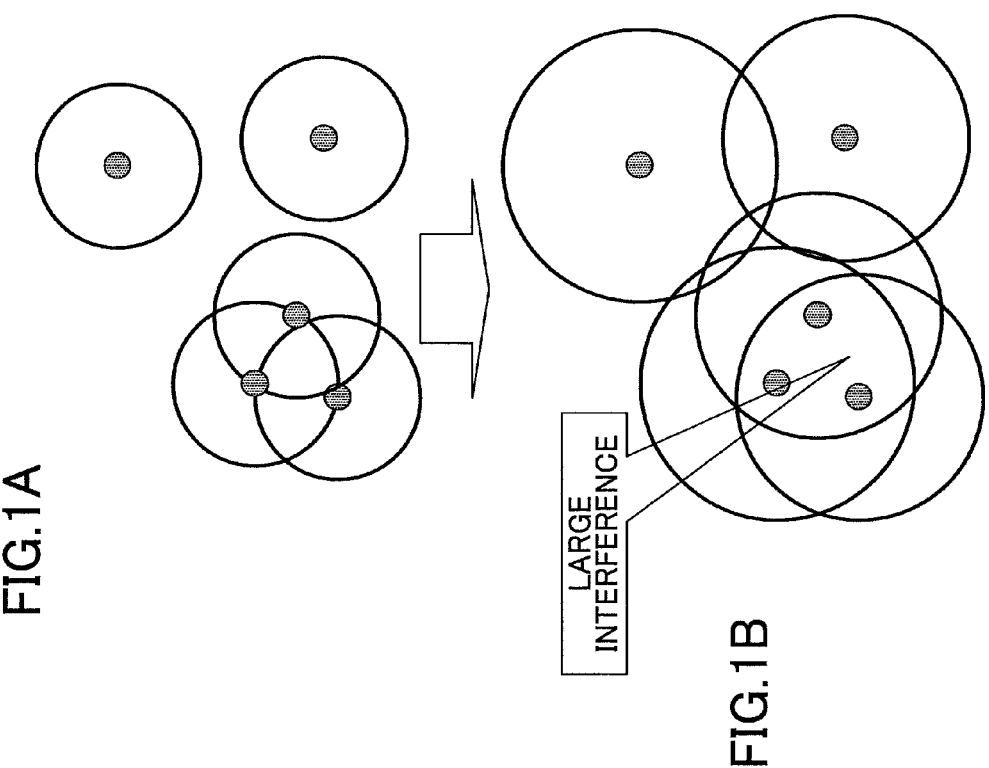

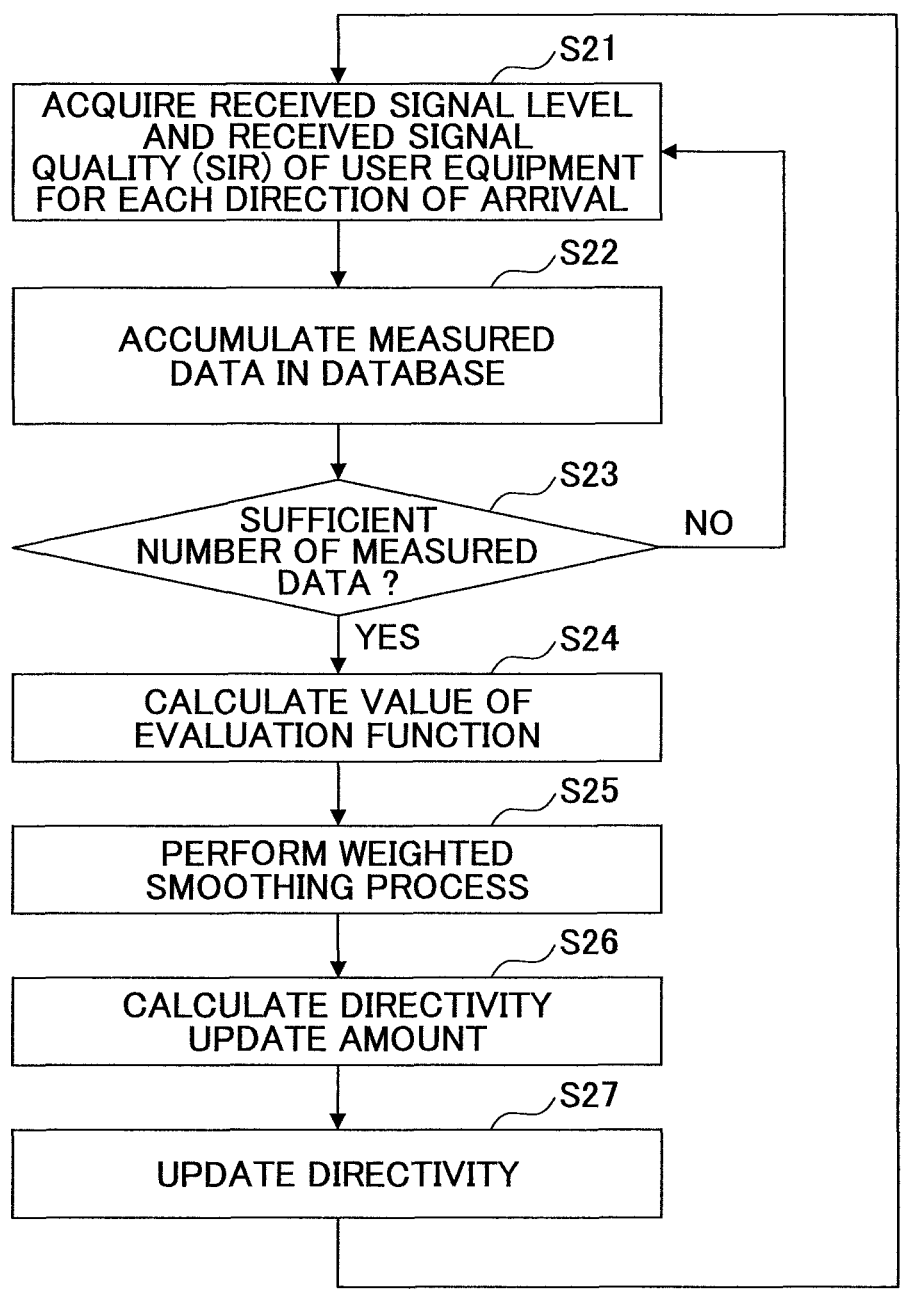

FIG.3

| ID | ANGLE (DIRECTION) OF POSITION OF USER EQUIPMENT TERMINAL | RECEIVED SIGNAL LEVEL (Ri) | RECEIVED SIGNAL QUALITY (SIRi) | EVALUATION VALUE (f) |
|---|---|---|---|---|
| 1 | 30° | −78dBm | 3dB | 0.1 |
| 2 | 53° | −82dBm | 0dB | 0.4 |
| 3 | | | | |
| ... | | | | |

FIG.5A

|  | COL 1<br>WHEN RECEIVED SIGNAL LEVEL IS LESS THAN THRESHOLD VALUE (Ri<RE) | COL 2<br>WHEN RECEIVED SIGNAL LEVEL IS EQUAL TO OR GREATER THAN THRESHOLD VALUE (RE≦Ri) |
|---|---|---|
| ROW 1<br>WHEN RECEIVED SIGNAL QUALITY IS EQUAL TO OR GREATER THAN THRESHOLD VALUE (SIRE≦SIRi) | f>0<br>(INCREASE DIRECTIVITY) | f=0<br>(MAINTAIN DIRECTIVITY) |
| ROW 2<br>WHEN RECEIVED SIGNAL QUALITY IS LESS THAN THRESHOLD VALUE (SIRi<SIRE) | f>0<br>(INCREASE DIRECTIVITY) | f<0<br>(DECREASE DIRECTIVITY) |

FIG.5B

|  | COL 1<br>WHEN RECEIVED SIGNAL LEVEL IS LESS THAN THRESHOLD VALUE (Ri<RE) | COL 2<br>WHEN RECEIVED SIGNAL LEVEL IS EQUAL TO OR GREATER THAN THRESHOLD VALUE (RE≦Ri) |
|---|---|---|
| ROW 1: WHEN RECEIVED SIGNAL QUALITY IS EQUAL TO OR GREATER THAN THRESHOLD VALUE (SIRE≦SIRi) | f>0 (INCREASE DIRECTIVITY) | WHEN Ps>Pth, f=0 (MAINTAIN DIRECTIVITY)<br>WHEN Ps≦Pth, f>0 (INCREASE DIRECTIVITY) |
| ROW 2: WHEN RECEIVED SIGNAL QUALITY IS LESS THAN THRESHOLD VALUE (SIRi<SIRE) | f>0 (INCREASE DIRECTIVITY) | f<0 (DECREASE DIRECTIVITY) |

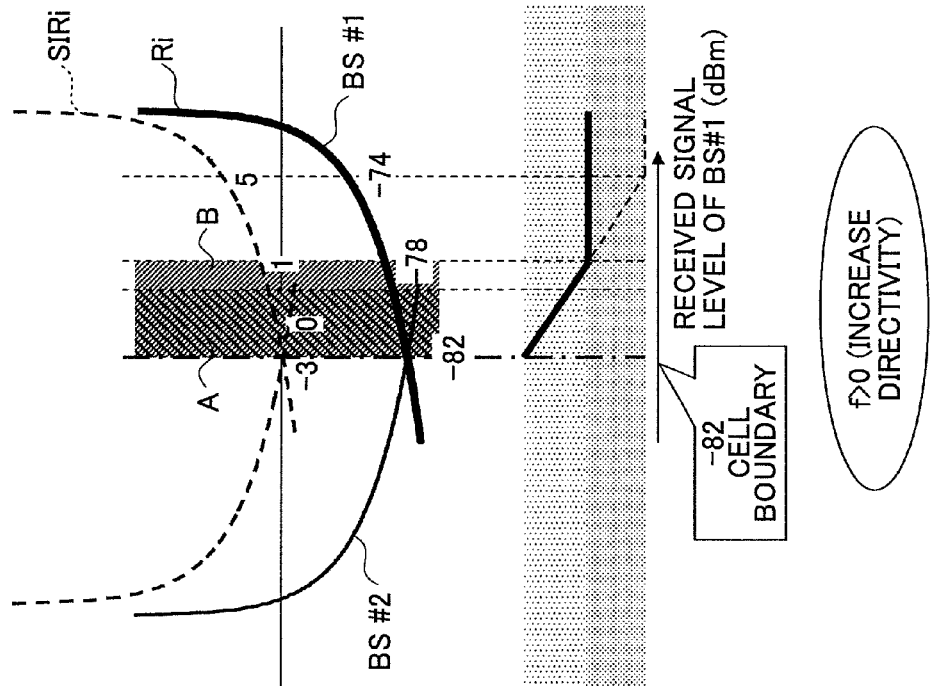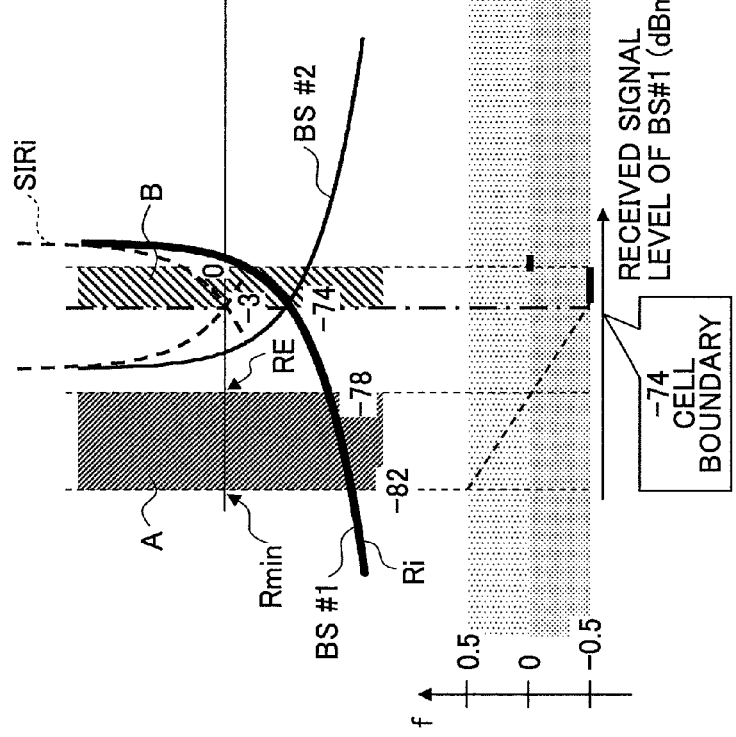

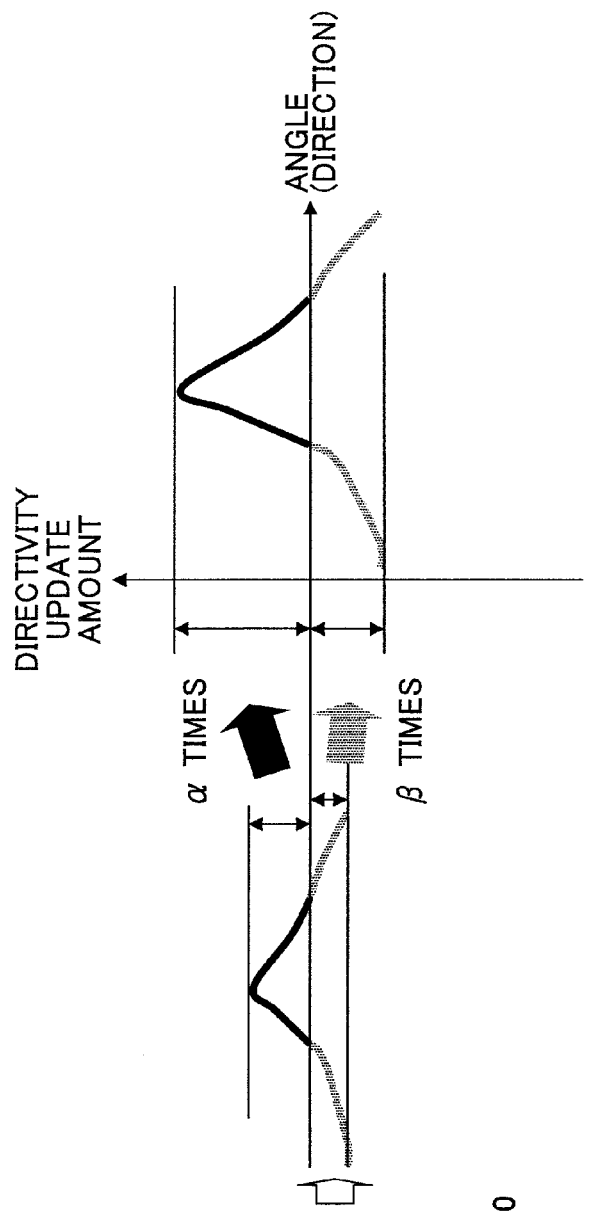

FIG.8A
FIG.8B
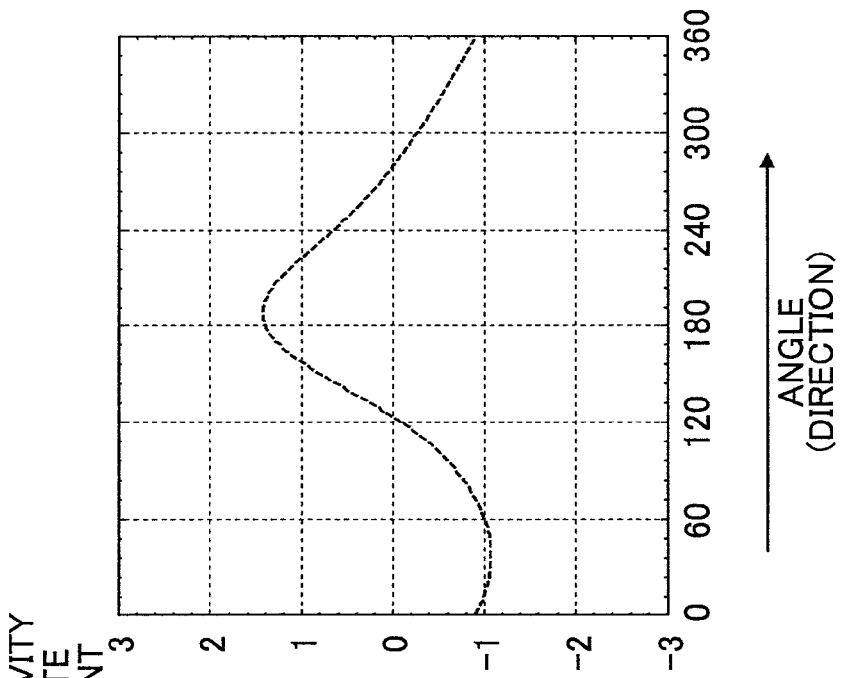
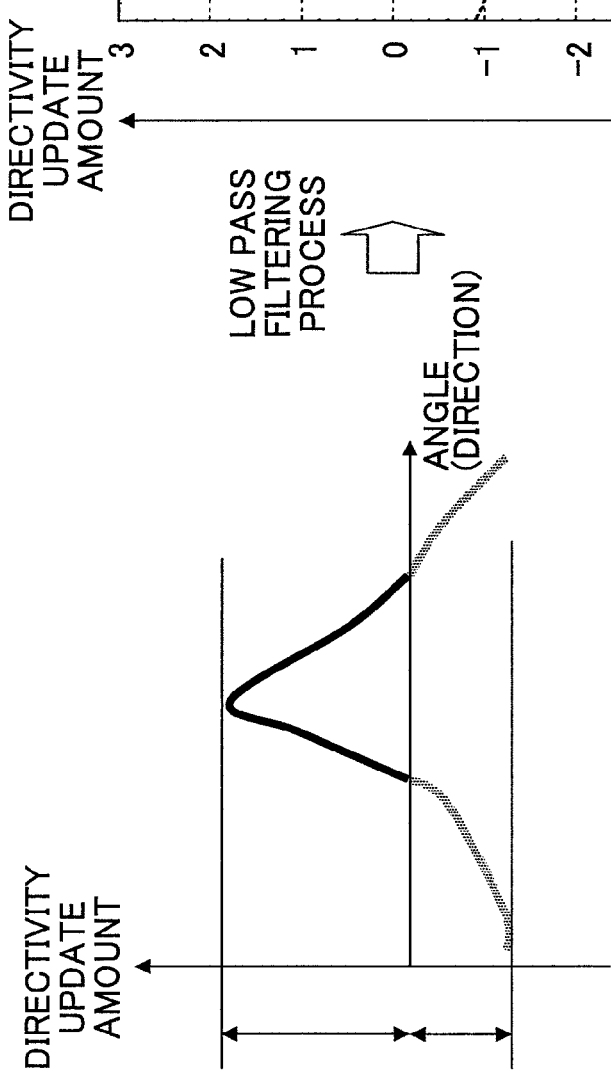

FIG.11A

| FREQUENCY | 5GHz |
|---|---|
| ANALYSIS RANGE | 700m × 700m |
| NUMBER OF BASE STATION APPARATUS | 16 |
| NUMBER OF MOBILE STATIONS (USER EQUIPMENT TERMINALS) | 5000 (REGULARLY DISTRIBUTED) |
| TRANSMISSION POWER OF BASE STATION APPARATUS | 7dBm (INITIAL VALUE) |
| RECEIVING ANTENNA GAIN | 0dBi |
| THRESHOLD VALUE OF RECEIVED SIGNAL LEVEL RE | −78dBm |
| THRESHOLD VALUE OF RECEIVED SIGNAL QUALITY SIRE | 0dB |
| ALLOWABLE MINIMUM RECEIVED SIGNAL LEVEL | −82dBm |
| PROPAGATION MODEL | FREE SPACE PROPAGATION MODEL |

FIG.11B

| FREQUENCY | 2GHz |
|---|---|
| ANALYSIS RANGE | 25m × 14m |
| NUMBER OF BASE STATION APPARATUS | 4 |
| NUMBER OF MOBILE STATIONS (USER EQUIPMENT TERMINALS) | 350 (REGULARLY DISTRIBUTED) |
| TRANSMISSION POWER OF BASE STATION APPARATUS | −25dBm (INITIAL VALUE) |
| RECEIVING ANTENNA GAIN | 0dBi |
| THRESHOLD VALUE OF RECEIVED SIGNAL LEVEL RE | −78dBm |
| THRESHOLD VALUE OF RECEIVED SIGNAL QUALITY SIRE | 0dB |
| ALLOWABLE MINIMUM RECEIVED SIGNAL LEVEL | −82dBm |
| PROPAGATION MODEL | BASED ON RAY-TRACING SIMULATION<br>CONDITIONS:<br>MAXIMUM REFLECTION NUMBER: 2<br>MAXIMUM TRANSMISSION NUMBER: 3<br>MATERIALS:<br>CONCRETE FOR OUTER WALL AND WALL OF CORRIDOR<br>PERMITTIVITY: $5.99 \times 10^{-11}$, CONDUCTIVITY: $2.30 \times 10^{-3}$<br>GLASS FOR WINDOW AND DOOR<br>PERMITTIVITY: $4.33 \times 10^{-11}$, CONDUCTIVITY: $1.00 \times 10^{-12}$<br>PLASTERBOARD FOR WALL OF ROOM<br>PERMITTIVITY: $3.54 \times 10^{-11}$, CONDUCTIVITY: $1.00 \times 10^{-2}$ |

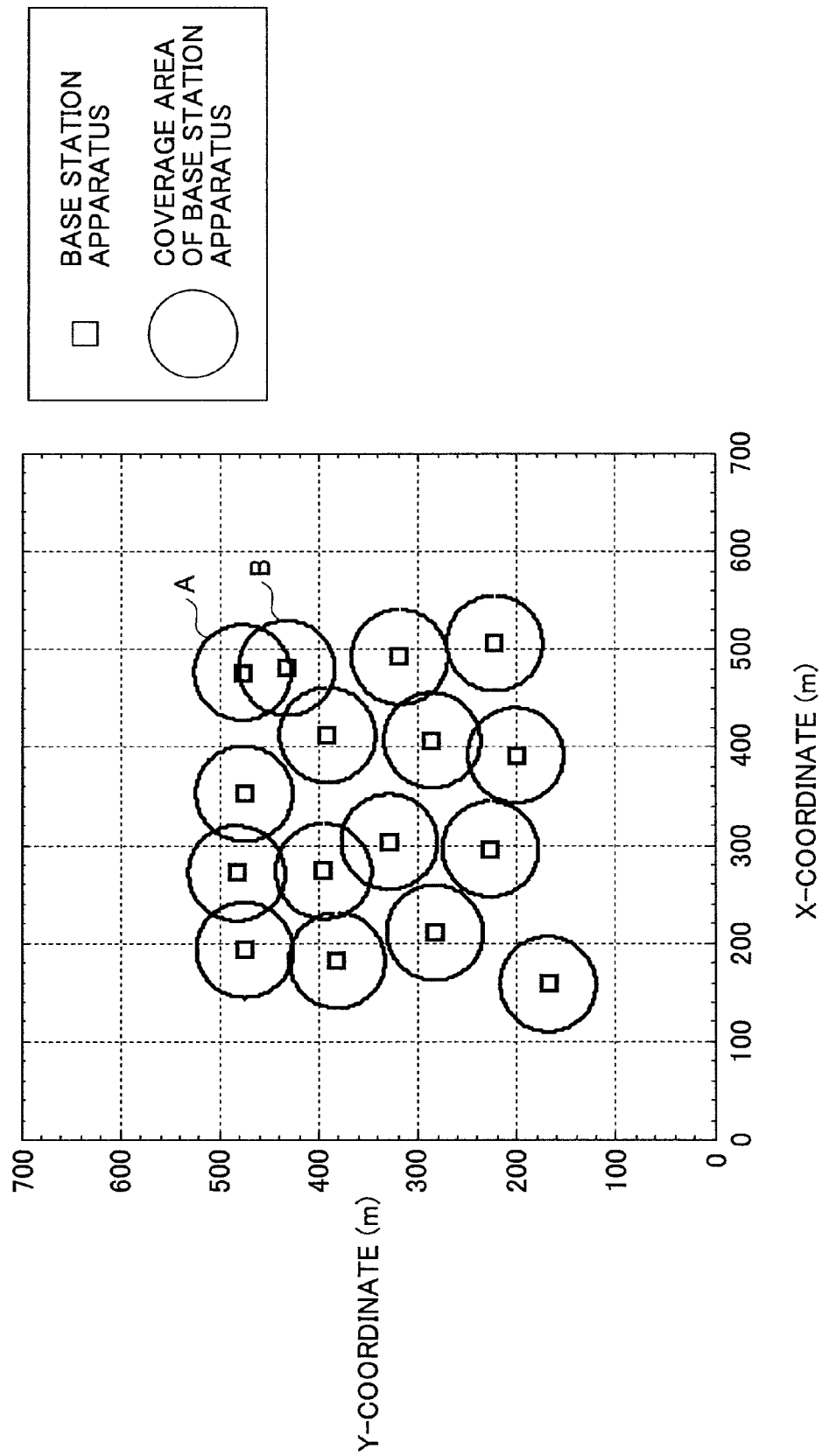

BASE STATION APPARATUS AND DIRECTIVITY CONTROL METHOD IN MOBILE COMMUNICATION SYSTEM

TECHNICAL FIELD

The present invention generally relates to a technical field of mobile communications, and more particularly to a base station apparatus and a directivity control method in a mobile communication system.

BACKGROUND ART

When a base station apparatus is installed in a mobile communication system, it is required to adequately set transmission power and a beam direction of the base station apparatus so as not to form a spot area where a mobile station (user equipment terminal) cannot communicate with any base station apparatus. Further, it is also required to reduce radio interference and the like from a neighboring cell so as to ensure communication quality in each coverage area of the base station apparatus. In ideal environments where there are no buildings and plural base stations are regularly distributed, the shape of the coverage areas is almost regular hexagonal. Further, when a base station is installed in the center of the coverage area having the regular hexagonal, the highest communication quality in the coverage area is obtained. However, in actual environments, there may be buildings or the like and the base station may be installed in limited area. As a result, the shape of the coverage area and the communication quality in the coverage area may not be ideal. To overcome the problem, when the coverage area is determined (i.e., in a coverage area design process), it is required to sufficiently determine radio propagation characteristics around the base stations and estimate the interference levels when the directivity pattern of the base station apparatus is changed to adjust (determine) the directivity pattern of the base station apparatus. Because of this feature, a person who carries out the above procedure is required to have highly technical knowledge in this field and further, the work burden of the person is far from trivial.

As a method to overcome the problem, there has been proposed a mobile communication system having a function of collecting distribution information of the neighboring base stations and mobile stations (user equipment (UE) terminals). In this system, based on the collected distribution information, the coverage area is automatically formed (see, for example, Patent Document 1). According to this technique (method), upon or after the installation of a base station, the base station acquires (receives) information from mobile stations located around the base station, the acquired (received) information including a received signal level received by each of the mobile stations, information of the base stations communicating with the mobile stations, and information of the total transmission power transmitted from the neighboring base stations. Based on the acquired information, the base station automatically determines the transmission power of the signal to be periodically broadcasted generally used for forming the coverage area of the base station without any assistance from an operator. By using this method, it may become possible for the base station to automatically form the coverage area in the mobile communication system by autonomically determining the transmission power of the broadcast signal of the base station while cooperating with the neighboring base stations.

Further, as the method of automatically forming the coverage area of the base station, there has been proposed a method of controlling the antenna directivity of the base station (see, for example, Patent Document 2). In this method, based on the information received from the mobile stations located around the base station, the information including the received signal level received by the mobile stations and based on the service coverage area information such as the traffic status of the base station and the neighboring base stations, the vertical plane directivity of the antenna of the base station is controlled. In the directivity control method, the antenna of the base station includes plural antenna elements aligned in a straight line in the vertical direction. By applying and cutting the signal to each of the antenna elements and by changing the phase of the signal applied to the antenna elements, and based on the service coverage area information, the number of antenna elements and the phases to be applied to the antenna elements are adjusted (controlled). By doing this, the antenna beam-width, antenna gain, and beam-tilt angle in the vertical plane of the directivity of the antenna are controlled. According to this method, it may become possible to flexibly form the coverage area of the base station based on the transmission power alone.

Patent Document 1: Japanese Patent Application Publication No.: 2006-135673

Patent Document 2: Japanese Patent Application Publication No.: 2005-109690

DISCLOSURE OF INVENTION

Problems to be Solved by the Invention

In a practical case of forming coverage areas of the base stations, since there are limited areas where the base stations can be installed, the base stations may have to be installed so that the base stations are not regularly distributed.

FIGS. 1A through 1C show an example where the base stations are installed in an irregularly distributed manner. In this case, the base stations may be relatively close to each other in some places and the base stations may be relatively separated from each other in some other places. In such circumstances, as described in Patent Document 2, when only the vertical plane directivity of the antenna of the base stations is controlled, due to the omnidirectional characteristics of the horizontal plane directivity, the overlapping of the coverage areas in a congested direction may become larger (as seen in FIG. 1B). In such an overlapped coverage area, the interference becomes larger, so that the communication quality may be remarkably degraded. In this case, in order to reduce the interference, for example, the transmission power is reduced or the beam-tilt angle (tilt angle) of the antenna is increased. However, as a result, an undesired area (spot) where a mobile station (user equipment terminal) can hardly communicate with any base station may be generated in an area where no base station can be installed (as seen in FIG. 1C).

To overcome the problem, there may be a method that a multi-sector antenna is provided so that the transmission power and the tilt angle can be finely (separately) controlled. In this case, the sizes of the sectors may vary due to the difference of the environments of the sectors. Therefore, it may be difficult to accurately (adequately) determine the number of sectors to be divided in each coverage area. To make it possible to flexibly perform cell design, there may be a method that many sectors to be divided are provided in advance and based on the necessary number of sectors, the necessary number of sectors are determined. However, if this is to be performed, the larger the number of the divided sectors, the larger the size of the antenna becomes. Further, the antenna and apparatus are required for each sector. Therefore, this method may become expensive and may not be practical. As described above, in the conventional methods, cell design cannot be carried out effectively and it is difficult to form a coverage area having a complicated cell shape automatically and at low cost.

According to an embodiment of the present invention, there may be provided a method of effectively performing cell design of a base station apparatus in accordance with actual environments where the base station apparatus is installed.

Means for Solving the Problems

According to an aspect of the present invention, there is provided a base station apparatus for a mobile communication system. The base station apparatus includes a collection unit collecting measured data from one or more user equipment terminals with respect to a plurality of directions of arrival, the measured data including at least quality information of a downlink signal, a conversion unit converting each measured data into an evaluation value in accordance with a predetermined evaluation function, a deriving unit deriving a weight update amount determining directivity based on an angular distribution of the plural evaluation values, and a transmission unit transmitting a downlink signal weighted based on the weight update amount.

Advantageous Effect of the Invention

According to an embodiment of the present invention, there may be provided a method of effectively performing cell design of a base station apparatus in accordance with actual conditions where the base station apparatus is installed.

BRIEF DESCRIPTION OF THE DRAWINGS

FIGS. 1A through 1C are schematic drawings showing coverage areas of the base stations installed in an irregularly distributed manner;

FIG. 2 is a flowchart showing an operational process performed by the base station according to an embodiment of the present invention;

FIG. 3 is a schematic table showing an example how measured data are accumulated in a database;

FIG. 5A is a table showing relationships between values of the evaluation functions and threshold values;

FIG. 5B is another table showing relationships between values of the evaluation functions and threshold values;

FIG. 6A is a graph showing a case where two base station are relatively close to each other;

FIG. 6B is a graph showing a case where two base station are relatively separated from each other;

FIGS. 7A through 7C show a process of deriving a directivity updated amount;

FIGS. 8A and 8B show another process of deriving a directivity update amount;

FIG. 11A is a table showing parameter data used in a simulation;

FIG. 11B is a table showing parameter data used in another simulation;

FIG. 12 is a drawing showing the initial conditions of the similation;

EXPLANATION OF REFERENCES

Figure 4A:
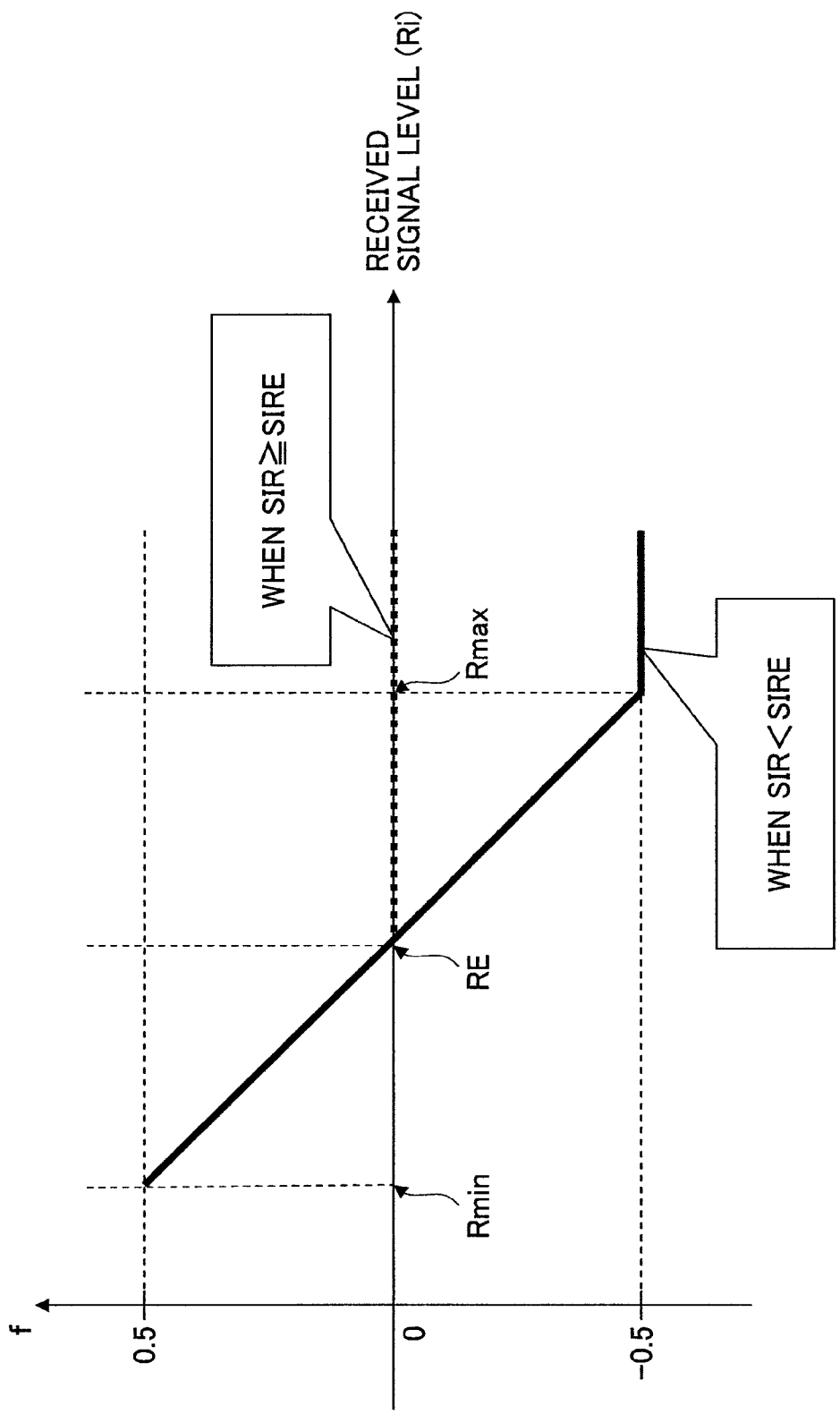
FIG. 4A is a graph showing an example of an evaluation function.

91: COMMUNICATION SECTION
92: INFORMATION ACQUISITION SECTION
93: DATABASE SECTION
94: EVALUATION FUNCTION CALCULATION SECTION
95: DIRECTIVITY UPDATE AMOUNT CALCULATION SECTION
96: ANTENNA WEIGHT DETERMINATION SECTION
101: COMMUNICATION SECTION
102: RECEIVED SIGNAL LEVEL/SIR MEASUREMENT SECTION
103: POSITION MEASUREMENT SECTION
104: STORAGE SECTION

BEST MODE FOR CARRYING OUT THE INVENTION

According to an embodiment of the present invention, a base station apparatus acquires measured data (Ri, SIRi) from at least one user equipment (UE) terminal for a plurality of directions of arrival (DOA). The measured data are converted into a plurality of evaluation values f based on a predetermined evaluation function f. Then, based on an angular distribution of the plural evaluation values of f, a weight update amount determining a directivity is derived, so that a downlink signal to be transmitted to the user equipment (UE) terminal is weighted based on the weight update amount. As described above, the weight update amount determining the directivity (directivity pattern) is derived based on the measured data transmitted from the user equipment (UE) terminals; therefore, it may become possible to achieve (form) a practical coverage area of the base station apparatus.

The value of the predetermined evaluation function may be increased or decreased based on the value of the received signal level of the downlink signal. Namely, when the value of the received signal level of the downlink signal is in a predetermined range (RE≤Ri≤Rmax), the value of predetermined evaluation function may differ depending on whether the value of SIR is equal to or greater than a threshold value. Since the evaluation function is required to have only simple characteristics like this, any of adequate various functional forms may be used as the evaluation function, which may be preferable from the viewpoints of the flexibility of designing (forming) coverage areas.

The angular distribution of the plural evaluation values of f may be derived by classifying the plural evaluation values of f for each direction of arrival (DOA) and performing a smoothing process on the classified evaluation values of f. In this case, data may be smoothed based on a so-called locally weighted smoothing process in which a data group within a predetermined range including the data is weighted averaged. It is preferable to perform the smoothing process from the viewpoints of preventing the occurrence of abrupt change in the directivity pattern. The direction of arrival (DOA) may be derived based on the positional information of the user equipment (UE) terminal(s) or derived by performing the direction of arrival (DOA) estimation algorithm.

In the following, some specific values may be used. However, unless otherwise described, those values are examples for explanatory purposes to facilitate understanding; Therefore, any other adequate values may also be used.

First Embodiment

Operational Example

FIG. 2 is a flowchart showing an exemplary operation performed by the base station apparatus according to an embodiment of the present invention. Namely, the exemplary operation of FIG. 2 is mainly performed in the base station apparatus of a mobile communication system. The mobile communication system includes plural base station apparatuses and one or more user equipment (UE) terminals. Typically, the user equipment (UE) terminal is a mobile station but may also include a fixed terminal. The base station apparatus transmits various signals to the user equipment (UE) terminal within the cell of the base station apparatus. However, according to an embodiment of the present invention, the base station apparatus transmits a downlink reference signal (RS) to the user equipment (UE) terminals. The reference signal may also be called a pilot signal including a signal pattern known to both a transmitting side and a receiving side. The user equipment (UE) terminal receives the downlink reference signal (RS) to measure a received signal level, a received signal quality and the like. As the received signal level, for example, the RSSI (Received Signal Strength Intensity) is typically measured. However, alternatively, any other appropriate amount may be measured. On the other hand, as the received signal quality, for example, a ratio of a desired signal power to an undesired signal power (or total power) like SIR (Signal to Interference power Ratio) or SINR (Signal to Interference plus Noise power Ratio) is typically measured. However, alternatively, similar to the received signal level, any other appropriate amount may be measured as the received signal quality.

Referring back to FIG. 2, in step S21, each of the user equipment (UE) terminals having received the downlink reference signal (RS) transmits the measured data to the base station apparatus. As described above, the measured data include the received signal level (Ri) and received signal quality (SIRi) ("Ri" and "SIRi" having the index "i" denote data based on the signals from an i-th user equipment (UE) terminal). The base station apparatus may acquire the measured data from one or more user equipment (UE) terminals for a predetermined period of time. Along with the measured data, the positional information of the user equipment (UE) terminals may be transmitted to the base station apparatus. The positional information of the user equipment (UE) terminals to be transmitted to the base station apparatus may be measured by a GPS (Global Positioning System) receiver or the like or may be measured by any other adequate positional information measurement method known in the art. The measured data may be transmitted based on an instruction from the base station apparatus to the user equipment (UE) terminal, or transmitted at a predetermined timing or when an event occurs in the user equipment (UE) terminal.

Next, in step S22, the base station apparatus accumulates the measured data from the user equipment (UE) terminals in a database. In this case, the measured data may be accumulated for a certain period of time or until a predetermined number of measured data are accumulated in the database. On the other hand, it is not always the case that one user equipment (UE) terminal transmits only one measured data to the base station apparatus. Namely, for example, one user equipment (UE) terminal may transmit the measured data at some place once and further transmit another measured data at another place to the base station apparatus.

FIG. 3 is a table showing an example where the measured data are accumulated in the database of the base station apparatus. As shown in FIG. 3, in each row of the table (database), a group of data including identification information (ID) of a user equipment (UE) terminal, angle for (direction of) the user equipment (UE) terminal, received signal level (Ri), received signal quality (SIRi), and evaluation value of evaluation function f are included for management. The evaluation value of the evaluation function f in the most right column in FIG. 3 is derived from the received signal level (Ri) and received signal quality (SIRi) and is described below. The angle for (direction of) the user equipment (UE) terminal is expressed by an angle indicating in which direction the user equipment (UE) terminal is located from the base station apparatus. This angle (direction) may be derived from the positional information of the user equipment (UE) terminal or may be provided by estimating the direction of arrival (DOA) by the base station apparatus. The direction of arrival (DOA) may be estimated based on any adequate method known in the art.

Next, in step S23 of FIG. 2, it is determined whether a sufficient number of the measured data have been acquired (accumulated). As the sufficient number, the number in a range from several tens to several thousand or any other adequate number may be used. In step S23, when determining that the sufficient number of the measured data have not been acquired yet, the process goes back to step S21. On the other hand, when determining that the sufficient numbers of the measured data have been acquired, the process goes to step S24. In this embodiment of the present invention, based on the measured data (which may also be called area information), a calculation (described below) determining the directivity is performed. However, there may be a case where the measured data necessary for the calculation cannot be timely acquired. Therefore, repeatedly accumulating the area information (measured data) transmitted from the user equipment (UE) terminals until sufficient numbers of the measured data are accumulated in the database to calculate a directivity update amount may contribute to the improvement of the quality of the coverage area automatically formed.

In step S24, in accordance with an evaluation function, the measured data are converted into the evaluation value of the evaluation function f. The evaluation value of the evaluation function f is provided with respect to each of the directions of arrival (DOA) per measured data. More specifically, in this embodiment of the present invention, the evaluation value of the evaluation function f is defined as follows:

1) when $R_{min} \leq R_i < RE$
   $f = 0.5(RF - R_i)/(RE - R_{min})$
2) when $RE \leq R_i \leq R_{max}$
   a) if $SIRE \leq SIR_i$
      $f = 0$
   b) if $SIR_i < SIRE$ -continued $$f=0.5(Ri-RE)/(RE-Rmax)$$
3) when Rmax≤Ri
   a) if SIRE≤SIRi
      f=0
   b) if SIRi<SIRE
      f=-0.5 where the symbol "RE" denotes a received signal level assumed to be observed when the user equipment (UE) terminal is located at the end of the area or at the end of the cell; the symbol "SIRE" denotes the value of SIR assumed to be observed when the user equipment (UE) terminal is located at the end of the area or at the end of the cell; the symbol "Ri" denotes the receives signal level of the downlink reference signal (RS) measured by the i-th user equipment (UE) terminal; the symbol "SIRi" denotes the SIR value measured by the i-th user equipment (UE) terminal. It is also assumed that a typical value of Ri is in a range from Rmin to Rmax.

FIG. 4A is a graph showing the values of the evaluation function f. As shown in FIG. 4A, the evaluation function f monotonously (or linearly in the case of FIG. 4A) decreases down to 0 as the received signal level Ri gradually increases from an (allowable) minimum received signal level (Rmin) up to a threshold value RE. In a case where the received signal level Ri further increases, when the value of SIRi is equal to or greater than the value of SIRE, the evaluation value of the evaluation function f remains zero (0). On the other hand, in a case where the received signal level Ri further increases, when the value of SIRi is less than the value of SIRE, the evaluation value of the evaluation function f further monotonously (or linearly in the case of FIG. 4A) decreases down to −0.5 as the received signal level Ri reaches an (allowable) maximum received signal level (Rmax) and remains −0.5 even when the received signal level Ri further increases beyond the (allowable) maximum received signal level (Rmax). However, the functional form of the evaluation value of the evaluation function f is not limited to the form shown in FIG. 4A, and any other various functional form may also be used as long as the evaluation function f increases or decreases depending on the value of received signal level Ri and when the value of received signal level Ri is in a predetermined range, the evaluation function f has different values depending on whether the value of SIRi is equal to or greater than the value of the predetermined value SIRE.

As shown in the right-most column of the table in FIG. 3, the base station apparatus converts the measured data into the evaluation value of the evaluation function f based on the evaluation function f. The converted evaluation value of the evaluation function f indicates whether the downlink transmission power toward the angle (direction) of the user equipment terminal having transmitted the measured data is to be increased (hereinafter may be referred to as "directivity is to be increased" for explanatory purposes).

FIG. 5A is a table showing an interrelationship between the received signal level Ri and the received signal quality SIRi. As shown in rows 1 and 2 of the table in FIG. 5A, the evaluation value of the evaluation function f is either a positive value or a negative value depending on the value of received signal level Ri. More specifically, as shown in column 1, when the received signal level Ri is less than the threshold value RE, the evaluation value of the evaluation function f is positive. The positive value means that the downlink transmission power is to be further increased. Contrarily, in column 2, the received signal level Ri is equal to or greater than the threshold value RE. In this case, when the received signal quality SIRi is equal to or greater than the threshold value SIRE, the evaluation value of the evaluation function f is zero (0), which indicates that the current directivity is to be maintained. Even though the received signal level Ri is equal to or greater than the threshold value RE, if the received signal quality SIRi is less than the threshold value SIRE, the interference power of the received signal is large. Therefore, in this case, the downlink transmission power is to be decreased.

FIGS. 6A and 6B show a difference between cases (examples) how the evaluation values (evaluation functions) f change when two (2) base stations are relatively close to each other and when two (2) base stations are separated from each other, respectively. In the figures, it is assumed that the symbols "BS#1" and "BS#2" denote a desired base station and a neighboring base station, respectively. FIG. 6A shows a case where two (2) base stations are installed at a close distance from each other, so that the overlapped coverage area covered by the two (2) base stations is large. In the figures, solid lines represent the received signal level Ri and dotted lines represent the received signal quality SIRi. Further, points where the received signal level Ri of the desired base station BS#1 is equal to that of neighboring base station BS#2 represent the cell boundary (area end). In the case of FIG. 6A, the received signal level Ri at the cell boundary is −74 dBm. Further, it is assumed that the received signal quality SIRi at the area end is −3 dB due to the interference wave from the neighboring base station BS#2. Further, it is assumed that the allowable minimum received signal level (Rmin) is −82 dBm and that the threshold value RE is −78 dBm. In the figures, the area in a range of the received signal level Ri from the allowable minimum received signal level (Rmin) to the threshold value RE is slightly hatched to provide a hatched area A (shown in left-hand side); and the area in a range of the received signal quality SIRi from equal to or more than −3 dB to equal to or less than the threshold value (0 dB) is heavily hatched to provide a hatched area B (shown in right-hand side).

In this case, according to the measured data from the user equipment (UE) terminal in the cell of the desired base station BS#1, the received signal level Ri is greater than −74 dBm and the received signal quality SIRi is less than 0 dB. Therefore, the evaluation value of the evaluation function f is a negative value, which indicates that the transmission power of the downlink signal to the direction of the user equipment (UE) terminal is to be decreased.

FIG. 6B shows a case where two (2) base stations are installed to be separated one from another, so that the overlapped coverage area covered by the two (2) base stations is small. In the case of FIG. 6B, the received signal level Ri of at the area end (cell boundary) is −82 dBm. According to the measured data from the user equipment (UE) terminal in the cell of the desired base station BS#1, the received signal level Ri is less than −74 dBm. Therefore, the evaluation value (evaluation function) f is a positive value, which indicates that the transmission power of the downlink signal to the direction of the user equipment (UE) terminal is to be increased. On the other hand, according to the measured data from the user equipment (UE) terminal in the vicinity of the cell, the received signal level Ri is greater than −74 dBm and the received signal quality SIRi is greater than 0 dB. Therefore, the evaluation value (evaluation function) f is zero (0), which indicates that the transmission power of the downlink signal to the direction of the user equipment (UE) terminal is to be maintained.

In step S25 of FIG. 2, many various evaluation values of the evaluation function f are smoothed. As shown in the table of FIG. 3, the measured data and the corresponding evaluation values of the evaluation function f are accumulated in the database along with the data of the direction of arrival (DOA). Therefore, those evaluation values of the evaluation function f are classified depending on the direction of arrival (DOA).

FIGS. 7A through 7B show an exemplary smoothing process on many various evaluation values of the evaluation function f. In FIG. 7A, many various evaluation values of the evaluation function f are expressed by using small circles and classified depending on the angles from 0 degree to 360 degrees. These evaluation values of the evaluation function f are smoothed in a manner so that one data (representing point) is determined for each unit direction. As a method of smoothing, the locally weighted smoothing process may be used. A typical example of the locally weighted smoothing process includes the LOWESS method or the like. The local weighting of a target data may be performed by weighted averaging the predetermined range of a data group including the target data. However, as the method of local weighting, any other adequate local weighting method known in the art may also be used. The results of the smoothing using the LOWESS method are the curved lines in FIGS. 7A and 7B.

In step S26 of FIG. 2, a scale of the smoothed evaluation values of the evaluation function f is adjusted to derive the weight update amount determining the directivity (directivity pattern). In this embodiment of the present invention, an integrated value in the angular distribution of the plural evaluation values of evaluation function f corresponds to an increase amount of the transmission power of the base station apparatus. More specifically, the integrated value of the positive part of the evaluation function f corresponds to the increase of the transmission power, and on the other hand, the integrated value of the negative part of the evaluation function f corresponds to the decrease of the transmission power. Because of this feature, it is required that the total transmission power of the base station apparatus after the update based on the total integrated value of the positive part and the negative part of the evaluation function f is be equal to or less than the allowable value. From the viewpoint of limitation of the total transmission power, the scale of the smoothed evaluation values of the evaluation function f is required to be adjusted. Further, the scale may be frequently adjusted as in step S25 based on the load of the base station apparatus.

FIG. 7C shows the directivity update amount calculated based on the process described above. As shown in FIG. 7C, the scale of the positive part is multiplied by α (α times) and the scale of the negative part is multiplied by β (β times). FIGS. 8A and 8B show a low pass filtering process performed on the directivity update amount obtained in FIG. 7C. By performing the low pass filtering process, the obtained curve line (graph) in FIG. 7C is further smoothed, which is preferable from the viewpoint of obtaining suitable values as the weight update amount determining the directivity (directivity pattern).

It may be preferable to smooth the graph of the evaluation function f as performed in this step from the viewpoint of minimizing the distortion of the directivity (antenna directivity pattern) as the updated result even when the evaluation function f abruptly changes in a short time period. Further, such distortion may lead to slowing the convergence rate in obtaining the weight update amount determining the directivity. Therefore, it may be preferable to perform smoothing from the viewpoint of accelerating the calculation of the weight update amount as well.

In step S27 of FIG. 2, the weight update amount (i.e., a difference between the current weight and the weight after update) derived as described above is applied to the current weight, so that the downlink signal is transmitted using the revised directivity pattern based on the weight update amount. The weight update amount (more specifically, data of amplitude and phase) to be applied to each of the antenna elements to achieve (change) the directivity pattern is determined in an antenna weight determination section (described below) of the base station apparatus. The data of amplitude and phase may be determined using the least-squares method or the like. For example, a case is considered where the directivity update amount as shown in FIG. 8B is derived. In this case, the directivity (i.e., directivity pattern) of the base station apparatus is to be adjusted so that the power gain in an angle range between 120 degrees and 270 degrees as seen from the base station apparatus is relatively large and the power gain in the other angle range is relatively small (more specifically, the power gain in an angle range between 150 degrees and 200 degrees is especially large and the power gain in an angle range between 0 degrees and 60 degrees is especially small). Herein, attention should be paid to the directivity update amount in FIG. 8B being not the weight itself to be directly applied but representing the difference from the current weight only. After step S27, the process goes back to step S21 to repeat the same procedure described above on an as-needed basis to adjust the directivity.

Base Station Apparatus

Figure 9:
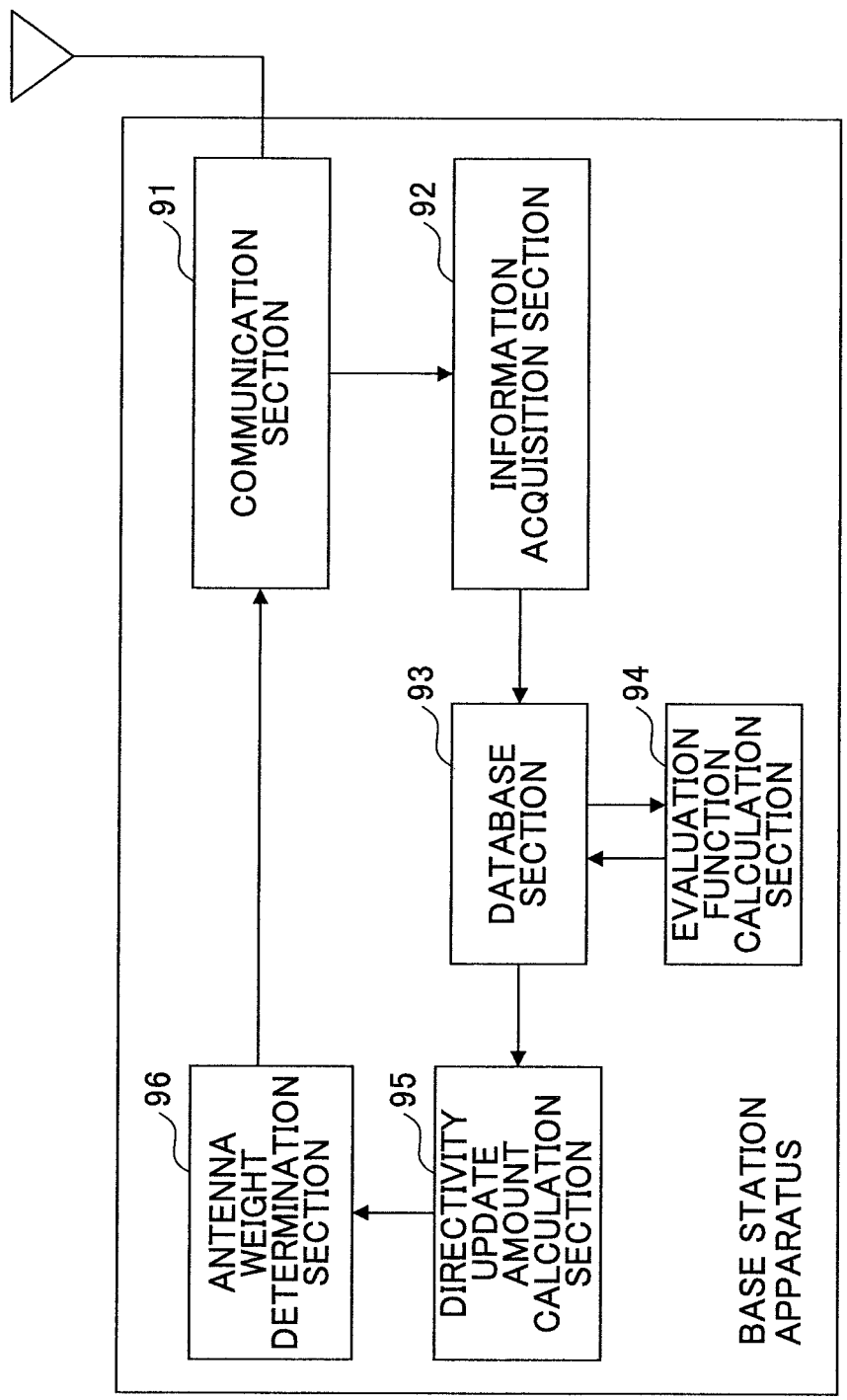
FIG. 9 is a block diagram of the base station apparatus according to an embodiment of the present invention.

FIG. 9 shows an exemplary configuration of the base station apparatus according to an embodiment of the present invention. As shown in FIG. 9, the base station apparatus includes a communication section 91 communicating with the mobile station (user equipment (UE) terminal), an information acquisition section 92 collecting information from user equipment terminals, a database section 93, an evaluation function calculation section 94, a directivity update amount calculation section 95, and the antenna weight determination section 96.

The communication section 91 serves as an interface enabling radio communications with a mobile station (more generally a user equipment (UE) terminal). In an embodiment of the present invention, the base station apparatus receives the measured data from the user equipment (UE) terminal via the communication section 91. As described above, the measured data includes at least the received signal level Ri and the received signal quality SIRi of the downlink reference signal (RS) received by the user equipment (UE) terminal.

The information acquisition section 92 extracts the measured data from the received signal from the base station apparatus to acquire the received signal level Ri and the received signal quality SIRi from the measured data. Further, when the positional information of the user equipment (UE) terminal is included in the measured data, the information acquisition section 92 further extracts (acquires) the positional information from the measured data.

The database section 93 accumulates the measured data (as shown in FIG. 3) from the user equipment (UE) terminals.

The evaluation function calculation section 94 converts each measured data into the corresponding evaluation value of the evaluation function f based on a predetermined evaluation function.

The directivity update amount calculation section 95 smoothes the graph of the angular distribution of the plural evaluation values of the evaluation function f to derive the weight update amount determining the directivity (i.e., directivity pattern).

The antenna weight determination section 96 provides the weight after update. As a method of calculating the weight, any adequate method known in the art may be used. After the weight update is provided, the base station apparatus transmits a signal via the communication section 91 based on the weight after update.

In the base station apparatus according to an embodiment of the present invention, the coverage area of the base station apparatus is autonomously formed. However, it may not really matter whether a neighboring base station apparatus has the same configuration as that of the base station apparatus according to an embodiment of the present invention.

User Equipment (UE) Terminal

Figure 10:
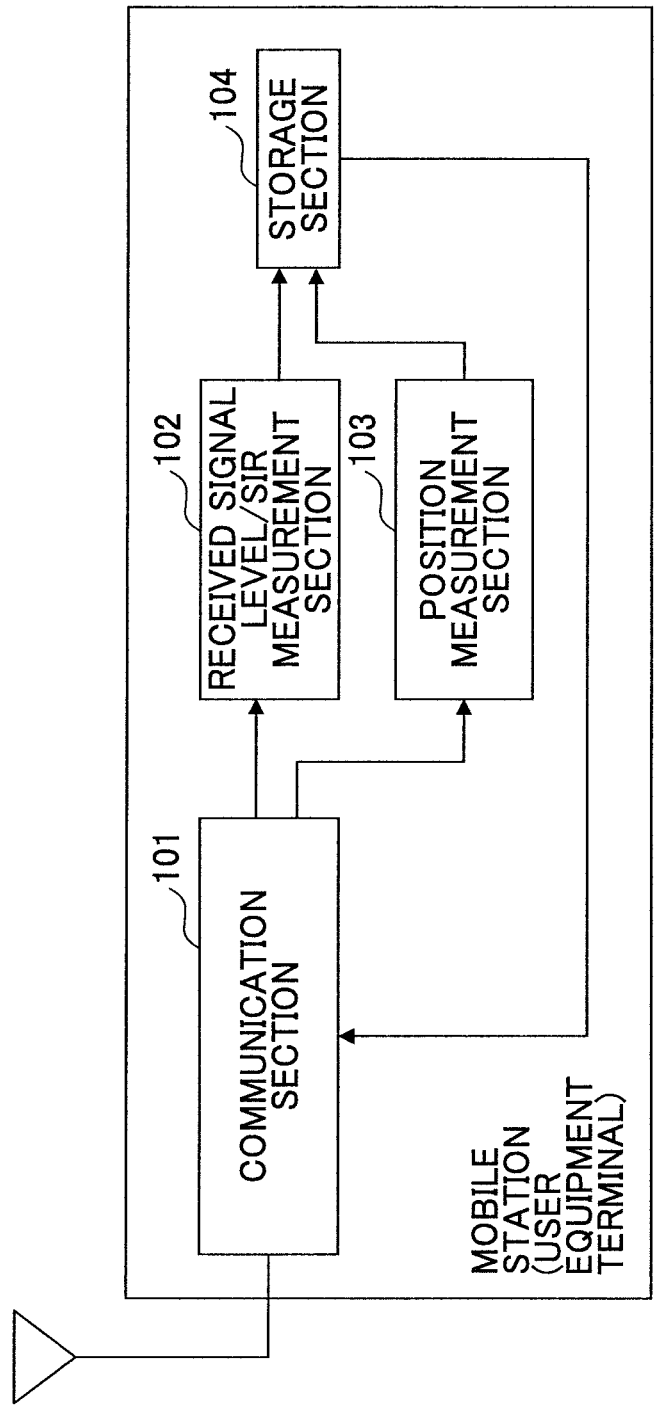
FIG. 10 is a block diagram of a mobile station (user equipment terminal) according to an embodiment of the present invention.

FIG. 10 shows an exemplary configuration of the user equipment (UE) terminal according to an embodiment of the present invention. As shown in FIG. 10, the user equipment (UE) terminal includes a communication section 101 communicating with the base station apparatus, a received signal level/SIR measurement section 102, and a storage section 104. The user equipment (UE) terminal may further include a position measurement section 103.

The communication section 101 serves as an interface enabling radio communications with the base station apparatus. In an embodiment of the present invention, the communication section 101 receives the downlink reference signal (RS) and transmits a signal including the measured data in uplink.

The received signal level/SIR measurement section 102 measures the received signal level Ri and the received signal quality SIRi of the downlink reference signal (RS). As described above, as the received signal level Ri and the received signal quality SIRi, any appropriate amounts may alternatively be used.

The position measurement section 103 is not an essential component of the user equipment (UE) terminal according to an embodiment of the present invention. However, when the user equipment (UE) terminal includes the position measurement section 103, the position measurement section 103 measures (determines) the position of the user equipment (UE) terminal. As the method of measuring the position of the user equipment (UE) terminal, for example, the GPS receiver may be used. Otherwise, any other measurement method known in the art may be used.

The storage section 104 stores the received signal level Ri and the received signal quality SIRi and further stores measured information such as the positional information on an as-needed basis and outputs those information items as the measured data.

Simulation Result

Next, a simulation result obtained in this embodiment of the present invention is described.

FIG. 11A shows parameters used in this simulation. In this simulation, as shown in FIG. 11A, there are provided 16 base station apparatus having the directivity control function described above in an area of 700 m by 700 m. Further, it is assumed that 5000 user equipment (UE) terminals are regularly distributed in this area. However, it is perceived that, in practical environments, a lesser number of user equipment (UE) terminals may be sufficient for the simulation. Further, it is assumed that the frequency used in this simulation is 5 GHz. Further, it is assumed that the initial value of the transmission power of the base station apparatus is 7 dBm; the threshold value of the received signal level (RE) is −78 dBm; the threshold value of the received signal quality (SIRE) is 0 dB; and the receiving sensitivity of the mobile station (user equipment UE terminal) (i.e., allowable minimum received signal level Rmin) is −82 dBm. As the propagation model, the free space propagation model is employed in which the power of the signal decreases as the free space propagation loss occurs along the direction from the base station apparatus to the user equipment (UE) terminal. Further, it is assumed that, as the antenna of the base station apparatus, a circular array antenna with an array radius of 0.3 wavelength and having six (6) antenna elements is used. Further, in the initial conditions, the horizontal plane directivity of the antennas of all the base station apparatuses is assumed to be omnidirectional. The directivity is repeatedly updated according to the process shown in FIG. 2. The shape of the directivity is calculated using the least-squares method. Further, it is assumed that the user equipment (UE) terminal transmits the measured data to the base station apparatus that provides the highest received signal power level to the user equipment (UE) terminal. Further, it is assumed that the base station apparatus is capable of ideally estimating the direction of arrival (DOA) from the user equipment (UE) terminal.

FIG. 12 shows the initial status of the coverage areas of the base station apparatus in this simulation process. From this initial status, the process shown in FIG. 2 is repeated nine (9) times to obtain the status of the coverage areas of the base station apparatuses shown in FIG. 13. As a result of the simulated coverage areas shown in FIG. 13, in general, the base stations located at the outer side tend to expand their coverage areas (beams of the directivity pattern) in the outward direction and on the other hand, the base stations located at the inner side tend to form their coverage areas smaller than those of the base stations located at the outer side.

Figure 13:
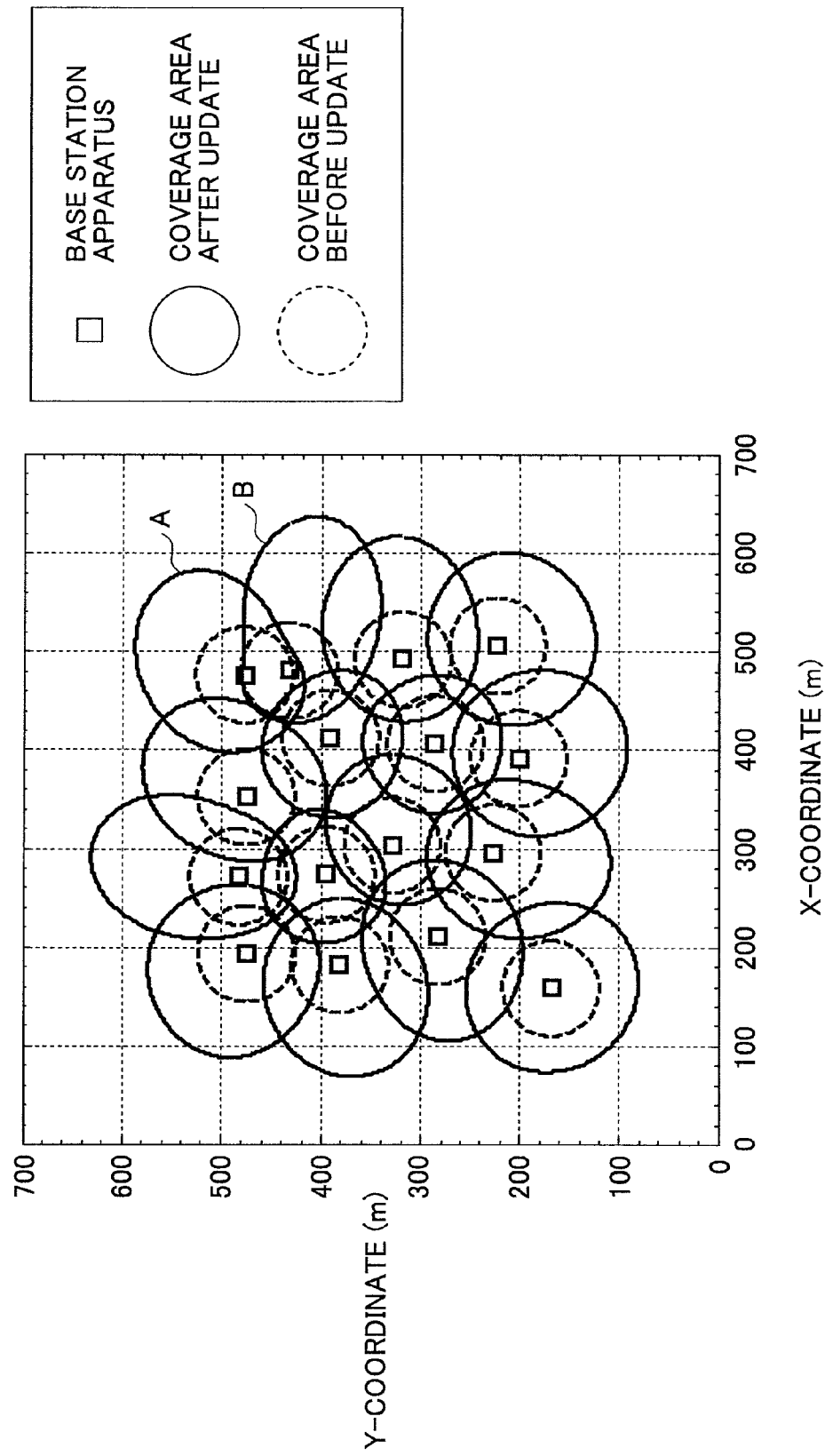
FIG. 13 is a drawing showing a result of the similation according to an embodiment of the present invention.

In FIG. 12, the base stations having the coverage areas A and B are very close to each other. In this case, if the transmission power of those base stations is simply increased while the horizontal plane directivity of the antennas of those base station apparatuses is kept omnidirectional, one base station apparatus may be within the coverage area of the other base station apparatus, and vice versa. However, according to an embodiment of the present invention, as shown in FIG. 13, the coverage areas A and B are formed (updated) in a manner so that the main lobe of the directional pattern of the coverage area A is different from that of the coverage area B. By forming (updating) the coverage areas in this manner, it may become possible to form a group of coverage areas of the base station apparatus having a wider area without forming a spot area where a mobile station (user equipment terminal) can hardly communicate with any base station (i.e., non-service area).

Figure 14A:
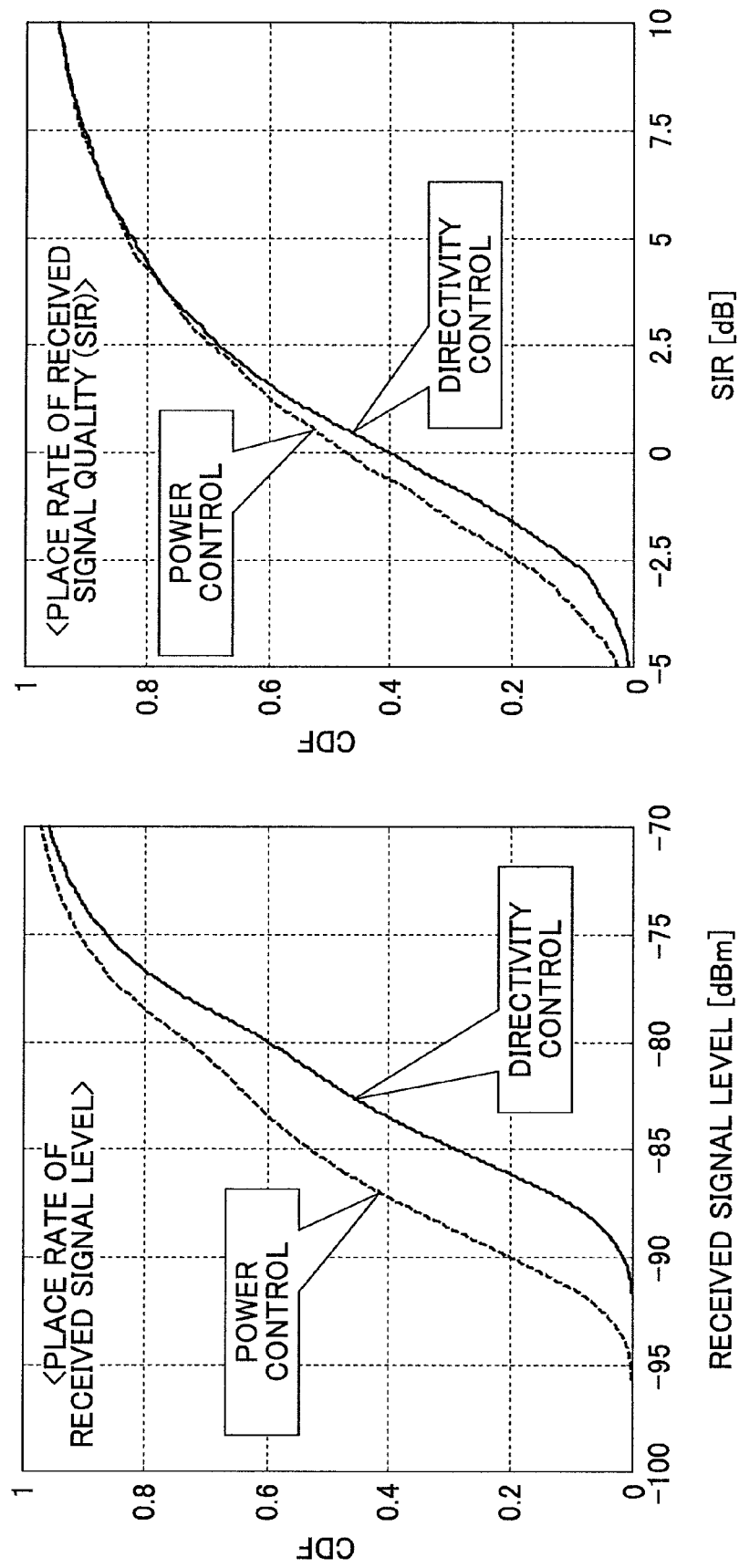
FIGS. 14A and 14B are graphs showing results of the simulation according to an embodiment of the present invention.
Figure 14B:
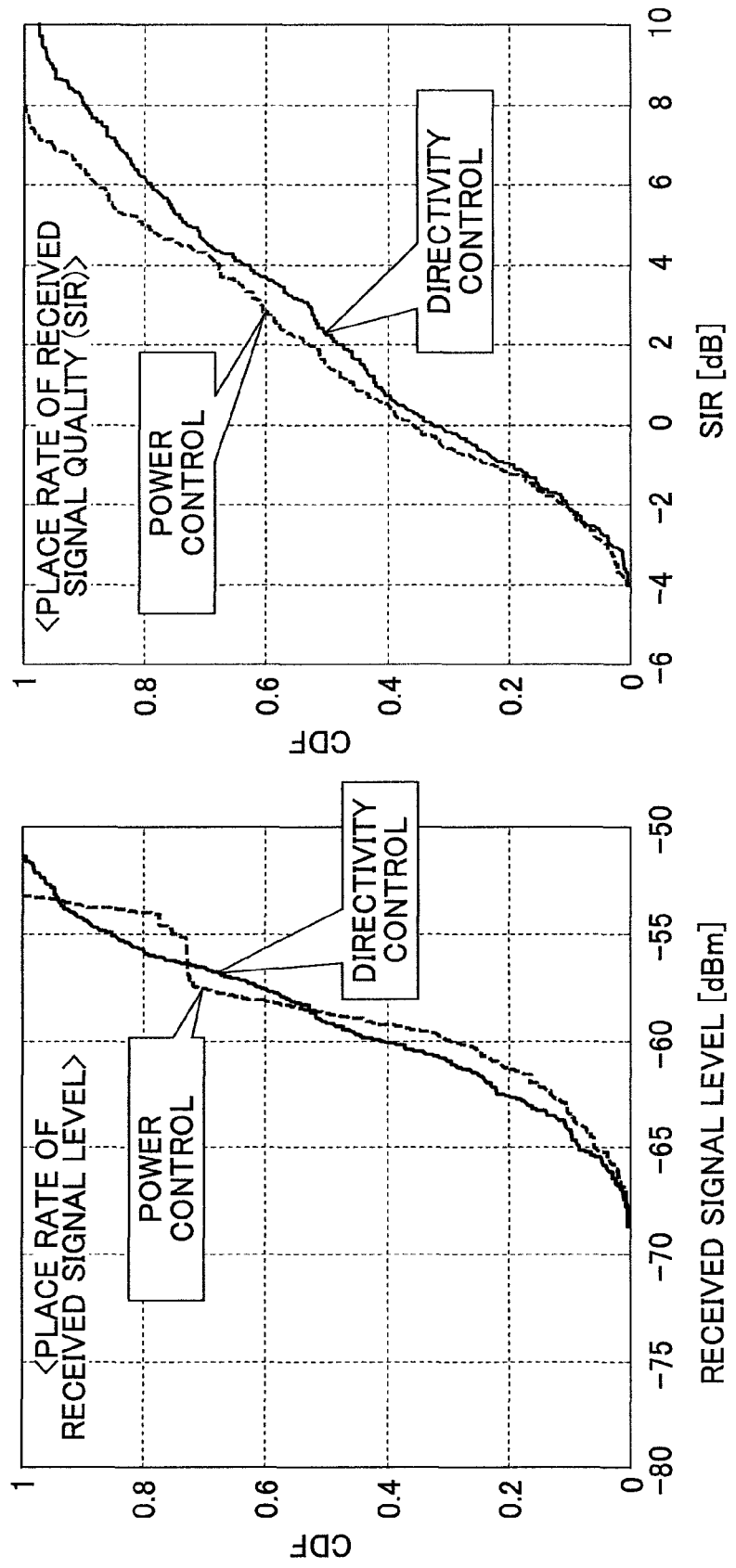

FIG. 14A shows a Cumulative Distribution Function (CDF) (or place rate) of the received signal level and FIG. 14B shows the CDF (or place rate) of the received signal quality (SIR) as the results of the simulations. In each of the simulation results as shown in FIGS. 14A and 14B, two results are shown: one result is that the coverage areas of the base station apparatuses are formed by controlling the transmission power of the base station apparatuses from the initial conditions where the directivity of the antennas of the base station apparatuses is omnidirectional (in the figures, "POWER CONTROL" is noted); and the other result is that the coverage areas of the base station apparatuses are formed by using the directivity control method according to an embodiment of the present invention from the same initial conditions as described above (in the figures, "DIRECTIVITY CONTROL" is noted). For example, in FIG. 14A showing the CDF (place rate) of the received signal level, in the case where the coverage areas are formed based on the "POWER CONTROL" described above, there are as many as 65% of the user equipment (UE) terminals having the received signal level less than −82 dBm. On the other hand, in the case where the coverage areas are formed based on the "DIRECTIVITY CONTROL" described above, there are only 49% of the user equipment (UE) terminals having the received signal level less than −82 dBm. In other words, there are only 35% of user equipment (UE) terminals having the received signal level equal to or greater than −82 dBm in the case of the "POWER CONTROL" and there are as many as 51% of user equipment (UE) terminals having the received signal level equal to or greater than −82 dBm in the case of the "DIRECTIVITY CONTROL", so that the CDF (place rate) is improved by 16%. Further, in a case where the value of the CDF (place rate) in the case where the coverage areas are formed based on the "POWER CONTROL" is regarded as a reference, when the control method is changed from the "POWER CONTROL" to the "DIRECTIVITY CONTROL", the number of base station apparatuses having the received signal level equal to or greater than −82 dBm is increased by as many as about 46% ((16%/35%)×100). On the other hand, in FIG. 14B showing the CDF (place rate) of the SIR, in the case where the coverage areas are formed based on the "POWER CONTROL", there are 53% of user equipment (UE) terminals having the SIR equal to or greater than 0 dB. On the other hand, in the case where the coverage areas are formed based on the "DIRECTIVITY CONTROL", there are 60% of the user equipment (UE) terminals having the SIR equal to or greater than 0 dB. In this case, the CDF (place rate) is improved by 7%. Further, in a case where the value of the CDF (place rate) is regarded as a reference when the coverage areas are formed based on the "POWER CONTROL", if the control method is changed from the "POWER CONTROL" to the "DIRECTIVITY CONTROL", the number of base station apparatuses having the SIR equal to or greater than 0 dB is increased by as many as about 13% ((7%/53%)×100).

Second Embodiment

According to the first embodiment described above, the coverage areas in the vicinity of positional coordinates measured by the user equipment (UE) terminals may be automatically formed. However, if there are any positional coordinates that cannot be measured by any user equipment (UE) terminal, it may be uncertain whether the coverage area in the vicinity of the unmeasured positional coordinates is formed. As a result, the coverage areas may not be adequately formed. However, there may be a case where there is a user equipment (UE) terminal in the vicinity of the unmeasured positional coordinates. It is preferable that the coverage areas can be adequately formed as much as possible even in the vicinity of the positional coordinates not measured by any user equipment (UE) terminal. A second embodiment of the present invention may respond to the demand. Namely, according to the second embodiment of the present invention, even when there are positional coordinates not measured by any user equipment (UE) terminal, the coverage area may be adequately formed as much as possible as long as the total transmission power of the base station apparatus is in a predetermined range (i.e., within a range of an allowable value or within a range not exceeding a threshold value set within the allowable value). This feature may be achieved by introducing a new evaluation function.

Operational Example

More specifically, only the process of step S24 in the flowchart of FIG. 2 is modified. Namely, any other processes of steps S21 through S23 and S25 through S27 are the same as those in the first embodiment of the present invention.

According to this embodiment of the present invention, in step S24, in accordance with an evaluation function, the measured data are converted into the evaluation values of the evaluation function f. The evaluation values of the evaluation function f are provided with respect to each of the directions of arrival (DOA) per measured data. Further, in this embodiment of the present invention, the evaluation value of the evaluation function f is defined as follows:

1) when $R_{min} \leq R_i < R_E$
   a) if $SIR_E \leq SIR_i$
      i) if $P_s \leq P_{th}$
         $f=0.5$
      ii) if $P_{th} < P_s$
         $f=0.5(R_F - R_i)/(R_E - R_{min})$
   b) if $SIR_i < SIR_E$
      $f=0.5(R_F - R_i)/(R_E - R_{min})$
2) when $R_E \leq R_i \leq R_{max}$
   a) if $SIR_E \leq SIR_i$
      i) if $P_s \leq P_{th}$
         $f=0.5$
      ii) if $P_{th} < P_s$
         $f=0$
   b) if $SIR_i < SIR_E$
      $f=0.5(R_i - R_E)/(R_E - R_{max})$
3) when $R_{max} \leq R_i$
   a) if $SIR_E \leq SIR_i$
      i) if $P_s \leq P_{th}$
         $f=0.5$
      ii) if $P_{th} < P_s$
         $f=0$
   b) if $SIR_i < SIR_E$
      $f=-0.5$ where the symbols "Ps" and "Pth" denote the total transmission power of the base station apparatus and the threshold value (set within the allowance value) of the transmission power of the base station apparatus, respectively. Other symbols denote the same meanings as those described in the first embodiment of the present invention.

Figure 4B:
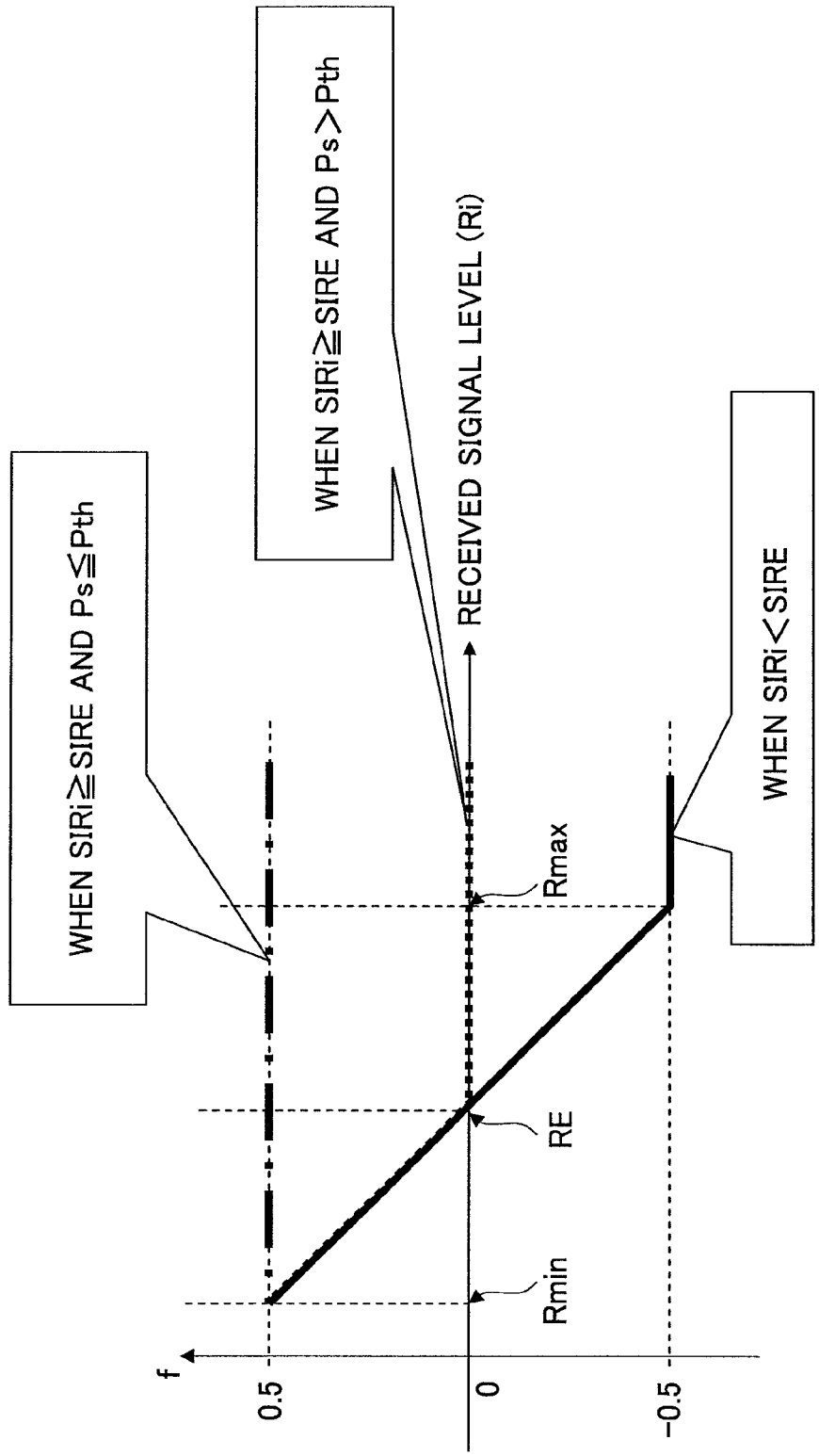
FIG. 4B is a graph showing an example of another evaluation function.

FIG. 4B is a graph of the evaluation function f. A difference from the first embodiment is that, when the total transmission power of the base station Ps is equal to or less than the threshold value Pth and when the quality signal quality SIRi is equal to or greater than the threshold value SIRE, the evaluation value of the evaluation function f is 0.5 regardless of the value of the received signal level Ri. It is assumed that there are positional coordinates not measured by any user equipment (UE) terminal. In this case, as long as the received signal quality SIRi of the user equipment (UE) terminal satisfies certain conditions, the user equipment (UE) terminal being located in the same direction as that of the positional coordinates when seen from the base station apparatus, the coverage area of the base station apparatus is allowed to be expanded but not to exceed the threshold value Pth of the transmission power of the base station apparatus. By additionally performing such estimation during the control of the directivity, the coverage areas may be more adequately formed.

Similar to FIG. 5A, FIG. 5B is a table showing an interrelationship between the received signal level Ri and the received signal quality SIRi. Generally, the evaluation function f in FIG. 5B is similar to that in FIG. 5A. However, the difference is that there is another option when the received signal quality SIRi is equal to or greater than the threshold value SIRE. Namely, when the base station apparatus can afford to increase the transmission power, the evaluation function f is a positive value so that the downlink transmission power may be increased to increase the directivity. On the other hand, when the base station apparatus cannot afford to increase the transmission power, the evaluation function f is zero (0) so that the current status is maintained.

According to this second embodiment of the presentation, the configurations of the base station apparatus and the user equipment (UE) terminal are the same as those in the first embodiment of the present invention, except that the base station apparatus according to the second embodiment of the present invention further performs a process of comparing the total transmission power of the base station apparatus Ps and the threshold value Pth in the evaluation function calculation section 94.

Simulation Result

Next, a simulation result according to this embodiment of the present invention is described.

Figure 11C:
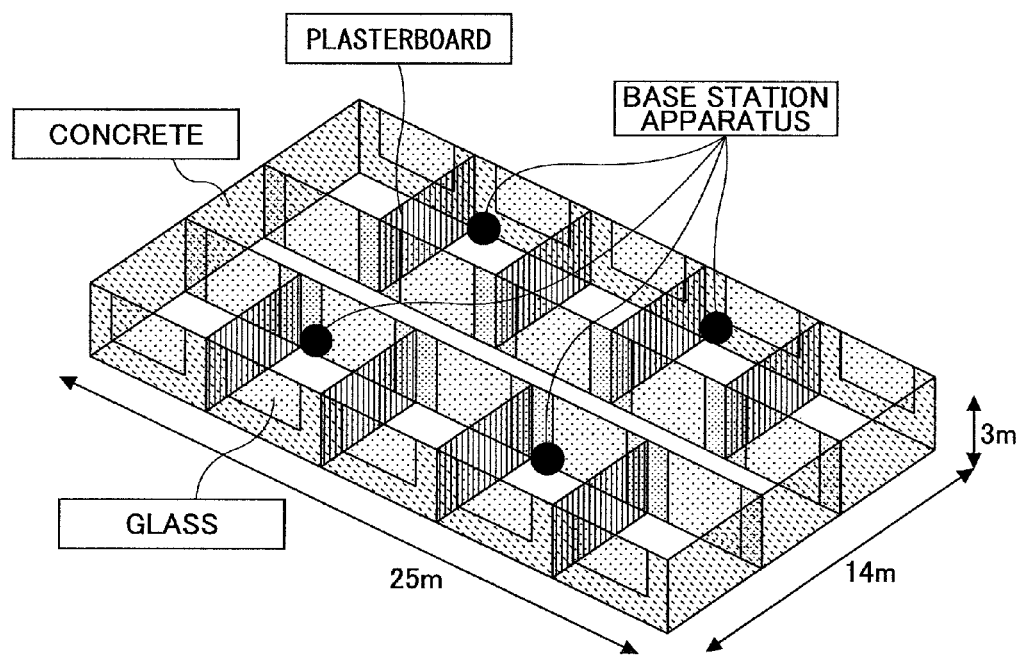
FIG. 11C is a drawing showing an environmental model of the similation of FIG. 11B.

FIG. 11B shows parameters used in this simulation. In this simulation, as shown in FIG. 11C, there are provided ten (10) rooms each having an area of 5 m by 5 m and a corridor of 4 m by 25 m on a floor (space) of 14 m by 25 m by 3 m. Further, there are four (4) base station apparatuses having the directivity control function according to this embodiment of the present invention and located at the positions indicated by block circles of FIG. 11C and at height of 2.5 m above the floor in the centers of the rooms. Further, it is assumed that there areas 350 user equipment (UE) terminals regularly distributed in this space. It is perceived that, in practical environments, a lesser number of user equipment (UE) terminals may be sufficient for the simulation. Further, it is assumed that the frequency used in this simulation is 2 GHz. Further, it is assumed that the initial value of the transmission power of the base station apparatus is −25 dBm; the threshold value of the received signal level (RE) is −78 dBm; the threshold value of the received signal quality (SIRE) is 0 dB; and the receiving sensitivity of the mobile station (user equipment UE terminal) (i.e., allowable minimum received signal level Rmin) is −82 dBm. As the propagation model, the structure of a model is such that the materials described in FIG. 11B are used as shown in FIG. 11C as the materials of the structure. Further, ray-tracing simulation in the direction from the base station apparatus to the user equipment (UE) terminals is used. Further, it is assumed that, as the antenna of the base station apparatus, a circular array antenna having six (6) antenna elements is used. Further, in this simulation, the maximum gain and the minimum gain of the antenna of the base station apparatus are set equal to +7.8 dBd and −2.2 dBd, respectively. However, in a practical use of the antenna, since those gains are to be determined based on the configuration of the array antenna, both the maximum gain and the minimum gain may not be set equal to values; only the maximum gain may be set equal to a value, only the minimum gain may be set equal to a value, or both the maximum gain and the minimum gain may set equal to values. Further, in the initial conditions, the horizontal plane directivity of the antennas of all the base station apparatuses is assumed to be omnidirectional. The directivity is repeatedly updated according to the process of FIG. 2. Further, it is assumed that the user equipment (UE) terminal transmits the measured data to the base station apparatus having provided the largest received signal level to the user equipment (UE) apparatus. Further, it is assumed that the direction of arrival (DOA) is determined as the direction in which the maximum power path is received and that the base station apparatus is capable of ideally estimating the direction of arrival (DOA) from the user equipment (UE) terminal.

Figure 15A:
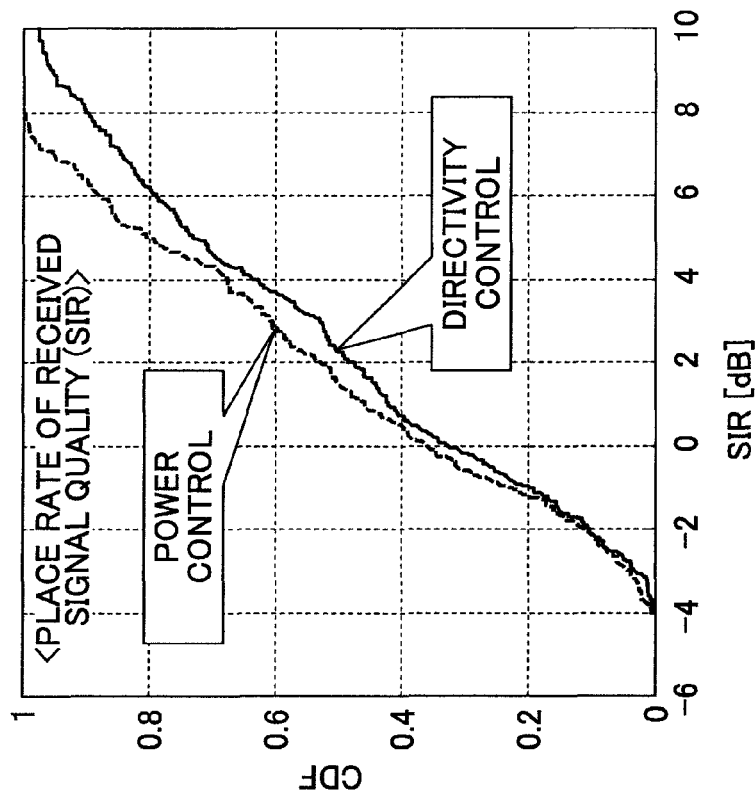
FIGS. 15A and 15B are graphs showing results of the simulation according to another embodiment of the present invention.
Figure 15B:
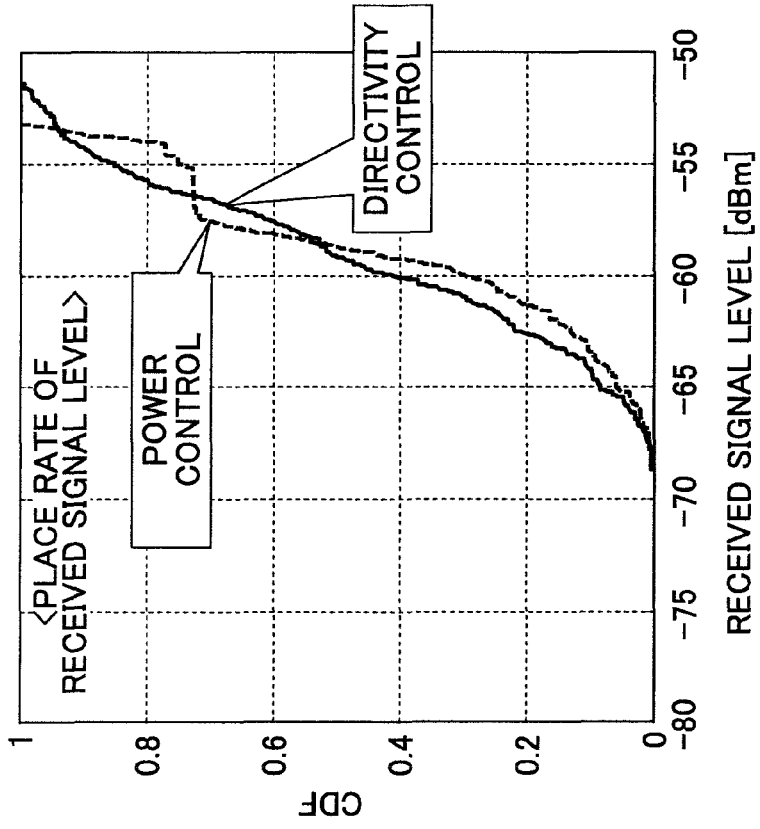

Similar to FIGS. 14A and 14B, FIG. 15A shows a Cumulative Distribution Function (CDF) (or place rate) of the received signal level and FIG. 15B shows the CDF (or place rate) of the received signal quality (SIR) as the results of the simulations. For example, in the simulation results of the CDF (or place rate) of the received signal level shown in FIG. 15A, a difference between the result of the "POWER CONTROL" and that of the "DIRECTIVITY CONTROL" is small, so that almost the same characteristics are obtained. Further, when either the "POWER CONTROL" or the "DIRECTIVITY CONTROL" is performed, all (100%) of user equipment (UE) terminals satisfy the conditions of both the receiving sensitivity of the user equipment (UE) terminal of −82 dBm and the threshold value of the received signal level (RE) of −78 dBm. On the other hand, in FIG. 15B showing the CDF (place rate) of the SIR, in the case where the coverage areas are formed based on the "POWER CONTROL", there are 47% of user equipment (UE) terminals having the SIR equal to or greater than 2 dB. On the other hand, in the case where the coverage areas are formed based on the "DIRECTIVITY CONTROL", there are 53% of the user equipment (UE) terminals having the SIR equal to or greater than 2 dB. In this case, the CDF (place rate) is improved by 6%. Further, in a case where the value of the CDF (place rate) is regarded as a reference when the coverage areas are formed based on the "POWER CONTROL", if the control method is changed from the "POWER CONTROL" to the "DIRECTIVITY CONTROL", the number of base station apparatuses having the SIR equal to or greater than 2 dB is increased by as many as about 13% ((6%/47%)×100).

The present invention is described above by referring to specific embodiments. However, a person skilled in the art may understand that the above embodiments are described for illustrative purposes only and may think of examples of various modifications, transformations, alterations, changes and the like. To promote an understanding of the present invention, the specific values are used as examples throughout the description. However, it should be noted that such specific values are just sample values unless otherwise described, and any other values may be used. For illustrative purposes, the apparatus according to an embodiment of the present invention is described with reference to functional block diagrams. However, such an apparatus may be provided by hardware, software, or a combination thereof. The present invention is not limited to the embodiments described above and various modifications, transformations, alteration, exchanges and the like may be made without departing from the scope and spirit of the present invention.

The present application is based on and claims the benefit of priority of Japanese Patent Application No. 2007-178726, filed on Jul. 6, 2007, and the entire contents of Japanese Patent Application No. 2007-178726 are hereby incorporated herein by reference.

The invention claimed is:

1. A base station apparatus for a mobile communication system, comprising:
 a collection unit configured to collect measured data from one or more user equipment terminals with respect to each direction of arrival, the measured data including at least quality information of a downlink signal;
 a conversion unit configured to convert the measured data into an evaluation value in accordance with a predetermined evaluation function;
 a deriving unit configured to derive a weight update amount based on an angular distribution of a plurality of evaluation values, the weight update amount determining directivity; and
 a transmission unit configured to transmit a downlink signal weighted based on the weight update amount,
 wherein the predetermined evaluation function increases or decreases depending on a received signal level of the downlink signal,
 wherein in a case where the received signal level of the downlink signal is in a predetermined range, the predetermined evaluation function is a positive value when the received signal level of the downlink signal is less than a predetermined first threshold value and the predetermined evaluation function is a negative value or 0 when the received signal level of the downlink signal is greater than or equal to the predetermined first threshold value, wherein in a case where the received signal level of the downlink signal is greater than or equal to the predetermined first threshold value, the predetermined threshold evaluation function is 0 when a ratio of a desired signal to power to an undesired signal power is greater than or equal to a predetermined second threshold value and the predetermined evaluation function is a negative value when the ratio of the desired signal power to the undesired signal power is less than the predetermined second threshold value, and wherein transmission power is increased when the predetermined evaluation function is a positive value, transmission power is decreased when the predetermined evaluation function is a negative value, and transmission power is maintained when the predetermined evaluation function is 0.

2. The base station apparatus according to claim 1, wherein when the predetermined evaluation function is represented by f, the following are satisfied:

when Rmin≤Ri<RE, f=0.5(RF−Ri)/(RE−Rmin);
when RE≤Ri<Rmax and SIRE≤SIRi, f=0;
when RE≤Ri<Rmax and SIRi<SIRE, f=0.5(Ri−RE)/(RE−Rmax);
when Rmax<Ri and SIRE≤SIRi, f=0; and
when Rmax<Ri and SIRi<SIRE, f=−0.5,
where a symbol "Ri" denotes the received signal level of the downlink reference signal measured by an i-th user equipment terminal;
a symbol "Rmin" denotes an allowable minimum value of the received signal level;
a symbol "Rmax" denotes an allowable maximum value of the received signal level;
a symbol "RE" denotes a predetermined threshold value with respect to the received signal level;
a symbol "SIRi" denotes the signal to interference power ratio as a received signal quality measured by the i-th user equipment terminal; and
a symbol "SIRE" denotes a predetermined threshold value with respect to the received signal quality.

3. The base station apparatus according to claim 1, wherein when the predetermined evaluation function is represented by f, the following are satisfied:

when Rmin≤Ri<RE, SIRE≤SIRi, and Ps≤Pth, f=0.5;
when Rmin≤Ri<RE, SIRE≤SIRi, and Pth<Ps, f=0.5(RE−Ri)/(RE−Rmin);
when Rmin≤Ri<RE and SIRi<SIRE, f=0.5(RE−Ri)/(RE−Rmin);
when RE≤Ri<Rmax, SIRE≤SIRi, and Ps≤Pth, f=0.5;
when RE≤Ri<Rmax, SIRE≤SIRi, and Pth<Ps, f=0;
when RE≤Ri<Rmax and SIRi<SIRE, f=0.5(Ri−RE)/(RE−Rmax);
when Rmax≤Ri, SIRE≤SIRi, and Ps≤Pth, f=0.5;
when Rmax≤Ri, SIRE≤SIRi, and Pth<Ps, f=0; and
when Rmax≤Ri and SIRi<SIRE, f=−0.5;
where a symbol "Ri" denotes the received signal level of the downlink reference signal measured by an i-th user equipment terminal;
a symbol "Rmin" denotes an allowable minimum value of the received signal level;
a symbol "Rmax" denotes an allowable maximum value of the received signal level;
a symbol "RE" denotes a predetermined threshold value with respect to the received signal level;
a symbol "SIRi" denotes the signal to interference power ratio as a received signal quality measured by the i-th user equipment terminal;
a symbol "SIRE" denotes a predetermined threshold value with respect to the received signal quality;
a symbol "Ps" denotes total transmission power of the base station apparatus; and
a symbol "Pth" denotes a threshold value set within an allowable value of the transmission power of the base station apparatus.

4. The base station apparatus according to claim 1, wherein the angular distribution of the plurality of evaluation values is derived by classifying the plurality of evaluation values into the directions of arrival (DOA) and performing a smoothing process on the classified evaluation values.

5. The base station apparatus according to claim 4, wherein a target data is smoothed based on a locally weighted smoothing process in which a data group within a predetermined range including the target data is weighted averaged.

6. The base station apparatus according to claim 1, wherein the direction of arrival is derived based on positional information of the user equipment terminal.

7. A directivity control method to be used in a base station apparatus for a mobile communication system, comprising:
a collecting step of collecting measured data from one or more user equipment terminals with respect to each direction of arrival, the measured data including at least quality information of a downlink signal;
a converting step of converting the measured data into an evaluation value in accordance with a predetermined evaluation function;
a deriving step of deriving a weight update amount based on an angular distribution of a plurality of evaluation values, the weight update amount determining directivity; and
a transmitting step of transmitting a downlink signal weighted based on the weight update amount,
wherein the predetermined evaluation function increases or decreases depending on a received signal level of the downlink signal,
wherein, in a case where the received signal level of the downlink signal is in a predetermined range, the predetermined evaluation function is a positive value when the received signal level of the downlink signal is less than a predetermined first threshold value and the predetermined evaluation function is a negative value or 0 when the received signal level of the downlink signal is greater than or equal to the predetermined first threshold value,
wherein in a case where the received signal level of the downlink signal is greater than or equal to the predetermined first threshold value, the predetermined threshold evaluation function is 0 when a ratio of a desired signal to power to an undesired signal power is greater than or equal to a predetermined second threshold value and the predetermined evaluation function is a negative value when the ratio of the desired signal power to the undesired signal power is less than the predetermined second threshold value, and
wherein transmission power is increased when the predetermined evaluation function is a positive value, transmission power is decreased when the predetermined evaluation function is a negative value, and transmission power is maintained when the predetermined evaluation function is 0.

8. The directivity control method according to claim 7, wherein
in the collecting step, the measured data are accumulated in a database so that the number of the measured data is equal to or greater than a predetermined number.

9. A base station apparatus for a mobile communication system, comprising:
a collection unit configured to collect measured data from one or more user equipment terminals with respect to each direction of arrival, the measured data including at least quality information of a downlink signal;
a conversion unit configured to convert the measured data into an evaluation value in accordance with a predetermined evaluation function;
a deriving unit configured to derive a weight update amount based on an angular distribution of a plurality of evaluation values, the weight update amount determining directivity; and
a transmission unit configured to transmit a downlink signal weighted based on the weight update amount,
wherein the predetermined evaluation function increases or decreases depending on a received signal level of the downlink signal, and
wherein in a case where the received signal level of the downlink signal is in a predetermined range, the predetermined evaluation function is a positive value when the received signal level of the downlink signal is less than a predetermined first threshold value,
wherein in a case where the received signal level of the downlink signal is in the predetermined range, the predetermined evaluation function is a negative value when the received signal level of the downlink signal is greater than or equal to the predetermined first threshold value and a ratio of a desired signal power to an undesired signal power is less than a predetermined second threshold value,
wherein in a case where the received signal level of the downlink signal is in the predetermined range, when the received signal level of the downlink signal is greater than or equal to the predetermined first threshold value and the ratio of the desired signal power to the undesired signal power is greater than or equal to predetermined second threshold value, the predetermined evaluation function is a positive value or 0 depending on a predetermined condition,
wherein the predetermined condition is whether the base station can afford to increase the transmission power thereof,
wherein the predetermined evaluation function is a positive value when the base station can afford to increase the transmission power and the predetermined evaluation function is 0 when the base station cannot afford to increase the transmission power, and
wherein transmission power is increased when the predetermined evaluation function is a positive value, transmission power is decreased when the predetermined evaluation function is a negative value, and transmission power is maintained when the predetermined evaluation function is 0.

10. A directivity control method to be used in a base station apparatus for a mobile communication system, comprising:
a collecting step of collecting measured data from one or more user equipment terminals with respect to each direction of arrival, measured data including at least quality information of a downlink signal;
a converting step of converting the measured data into an evaluation value in accordance with a predetermined evaluation function;
a deriving step of deriving a weight update amount based on an angular distribution of the plural evaluation values, the weight update amount determining directivity; and
a transmitting step of transmitting a downlink signal weighted based on the weight update amount,
wherein the predetermined evaluation function increases or decreases depending on a received signal level of the downlink signal, and
wherein in a case where the received signal level of the downlink signal is in a predetermined range, the predetermined evaluation function is a positive value when the received signal level of the downlink signal is less than a predetermined first threshold value,
wherein in a case where the received signal level of the downlink signal is in the predetermined range, the predetermined evaluation function is a negative value when the received signal level of the downlink signal is greater than or equal to the predetermined first threshold value and a ratio of a desired signal power to an undesired signal power is less than a predetermined second threshold value,
wherein in a case where the received signal level of the downlink signal is in the predetermined range, when the received signal level of the downlink signal is greater than or equal to the predetermined first threshold value and the ratio of the desired signal power to the undesired signal power is greater than or equal to the predetermined second threshold value, the predetermined evaluation function is a positive value or 0 depending on a predetermined condition,
wherein the predetermined condition is whether the base station can afford to increase the transmission power thereof,
wherein the predetermined evaluation function is a positive value when the base station can afford to increase the transmission power and the predetermined evaluation function is 0 when the base station cannot afford to increase the transmission power, and
wherein transmission power is increased when the predetermined evaluation function is a positive value, transmission power is decreased when the predetermined evaluation function is a negative value, and transmission power is maintained when the predetermined evaluation function is 0.

11. The directivity control method according to claim 10, wherein in the collecting step, the measured data are accumulated in a database so that the number of the measured data is equal to or greater than a predetermined number.

* * * * *